US010070410B2

(12) United States Patent
Mori et al.

(10) Patent No.: US 10,070,410 B2
(45) Date of Patent: Sep. 4, 2018

(54) COMMUNICATION APPARATUS AND COMMUNICATION SYSTEM

(71) Applicant: FUJI XEROX CO., LTD., Tokyo (JP)

(72) Inventors: Taro Mori, Kanagawa (JP); Hiroshi Mikuriya, Kanagawa (JP); Hiroyuki Tojo, Kanagawa (JP); Satoshi Isobe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/496,365

(22) Filed: Apr. 25, 2017

(65) Prior Publication Data
US 2018/0139716 A1 May 17, 2018

(30) Foreign Application Priority Data

Nov. 16, 2016 (JP) ................................. 2016-223620

(51) Int. Cl.
*H04W 84/18* (2009.01)
*H04W 64/00* (2009.01)
*H04B 17/00* (2015.01)
*H04W 40/10* (2009.01)
*H04W 40/24* (2009.01)
*H04W 4/00* (2018.01)
*H04W 4/80* (2018.01)

(52) U.S. Cl.
CPC ............ *H04W 64/00* (2013.01); *H04B 17/00* (2013.01); *H04W 40/10* (2013.01); *H04W 40/24* (2013.01); *H04W 4/008* (2013.01); *H04W 4/80* (2018.02); *H04W 84/18* (2013.01)

(58) Field of Classification Search
CPC .............................. H04W 40/10; H04W 40/24
USPC ........ 455/522, 69, 456.1, 456.6, 445, 452.1, 455/452.2
See application file for complete search history.

(56) References Cited

U.S. PATENT DOCUMENTS

2010/0157827 A1* 6/2010 Park .................... H04L 43/0852
370/252
2016/0150577 A1* 5/2016 Fan ....................... H04W 92/14
455/450
2017/0007502 A1* 1/2017 Teshima .................... A61J 3/02

FOREIGN PATENT DOCUMENTS

JP 2008-244891 A 10/2008
JP 2010-148088 A 7/2010

* cited by examiner

Primary Examiner — John J Lee
(74) Attorney, Agent, or Firm — Oliff PLC

(57) ABSTRACT

A communication apparatus includes:
a setting unit that sets plural candidate points which are candidates of positions of a transmitter based on a position of one of plural receivers that receive radio waves from the transmitter; and
a specifying unit that specifies a position of the transmitter from among the plural candidate points by using (i) strengths of the radio waves which one or more receivers including a receiver other than the one receiver receive from the transmitter and (ii) strengths of the radio waves which are inferred to be received by the one or more receivers from the transmitter when it is assumed that the transmitter exists at each of the plural candidate points.

10 Claims, 25 Drawing Sheets

*FIG.11*

| COMMUNICATION APPARATUS | TRANSMITTING SOURCE LIST |
|---|---|
| COMMUNICATION APPARATUS 100A | — |
| COMMUNICATION APPARATUS 100B | — |
| COMMUNICATION APPARATUS 100C | COMMUNICATION APPARATUS 100A,100B |
| COMMUNICATION APPARATUS 100D | COMMUNICATION APPARATUS 100A,100B |
| COMMUNICATION APPARATUS 100E | COMMUNICATION APPARATUS 100C,100D |
| COMMUNICATION APPARATUS 100F | COMMUNICATION APPARATUS 100C,100D |

*FIG.12C*

| COMMUNICATION APPARATUS | TRANSMITTING SOURCE LIST |
|---|---|
| COMMUNICATION APPARATUS 100A | ~ |
| COMMUNICATION APPARATUS 100B | ~ |
| COMMUNICATION APPARATUS 100C | COMMUNICATION APPARATUS 100A |
| COMMUNICATION APPARATUS 100D | COMMUNICATION APPARATUS 100A,100B |
| COMMUNICATION APPARATUS 100E | COMMUNICATION APPARATUS 100C,100D |
| COMMUNICATION APPARATUS 100F | ~ |

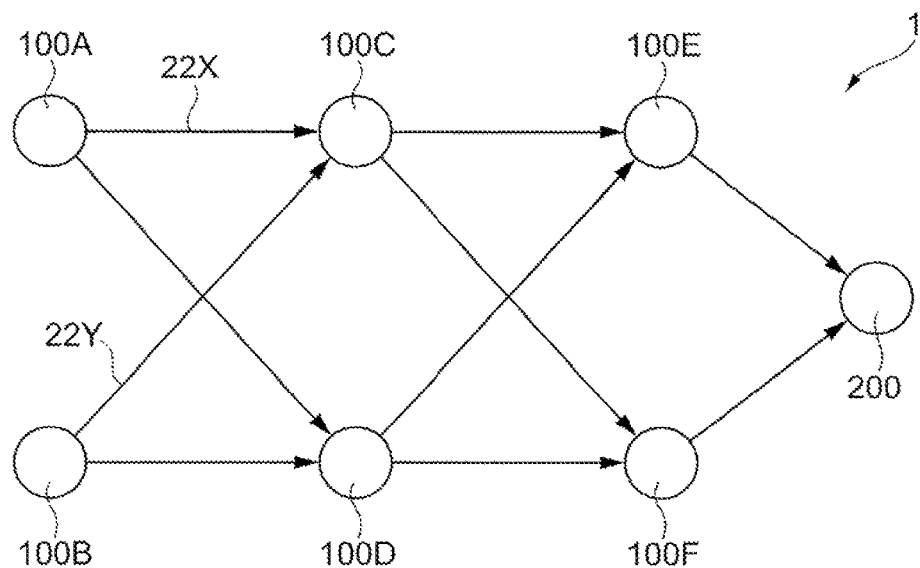

COMMUNICATION APPARATUS AND COMMUNICATION SYSTEM

CROSS-REFERENCE TO RELATED APPLICATIONS

This application is based on and claims priority under 35 USC 119 from Japanese Patent Application No. 2016-223620 filed Nov. 16, 2016.

BACKGROUND

Technical Field

The present invention relates to a communication apparatus and a communication system.

SUMMARY

According to an aspect of the invention, a communication apparatus includes:

a setting unit that sets plural candidate points which are candidates of positions of a transmitter based on a position of one of plural receivers that receive radio waves from the transmitter; and a specifying unit that specifies a position of the transmitter from among the plural candidate points by using (i) strengths of the radio waves which one or more receivers including a receiver other than the one receiver receive from the transmitter and (ii) strengths of the radio waves which are inferred to be received by the one or more receivers from the transmitter when it is assumed that the transmitter exists at each of the plural candidate points.

BRIEF DESCRIPTION OF THE DRAWINGS

Exemplary embodiments of the present invention will be described in detail based on the following figures, wherein:

FIG. 11 is a diagram illustrating an example of determination information;

FIGS. 12A to 12C are diagrams for describing a specific example of a processing in which the management server detects abnormality in a network;

FIGS. 21A and 21B are diagrams for describing the specific example of a processing in which the management server determines an abnormality cause in the network according to the second exemplary embodiment.

DETAILED DESCRIPTION

Hereinafter, exemplary embodiments of the present invention will be described in detail with reference to the accompanying drawings.

First Exemplary Embodiment

Entire Configuration

Figure 1:
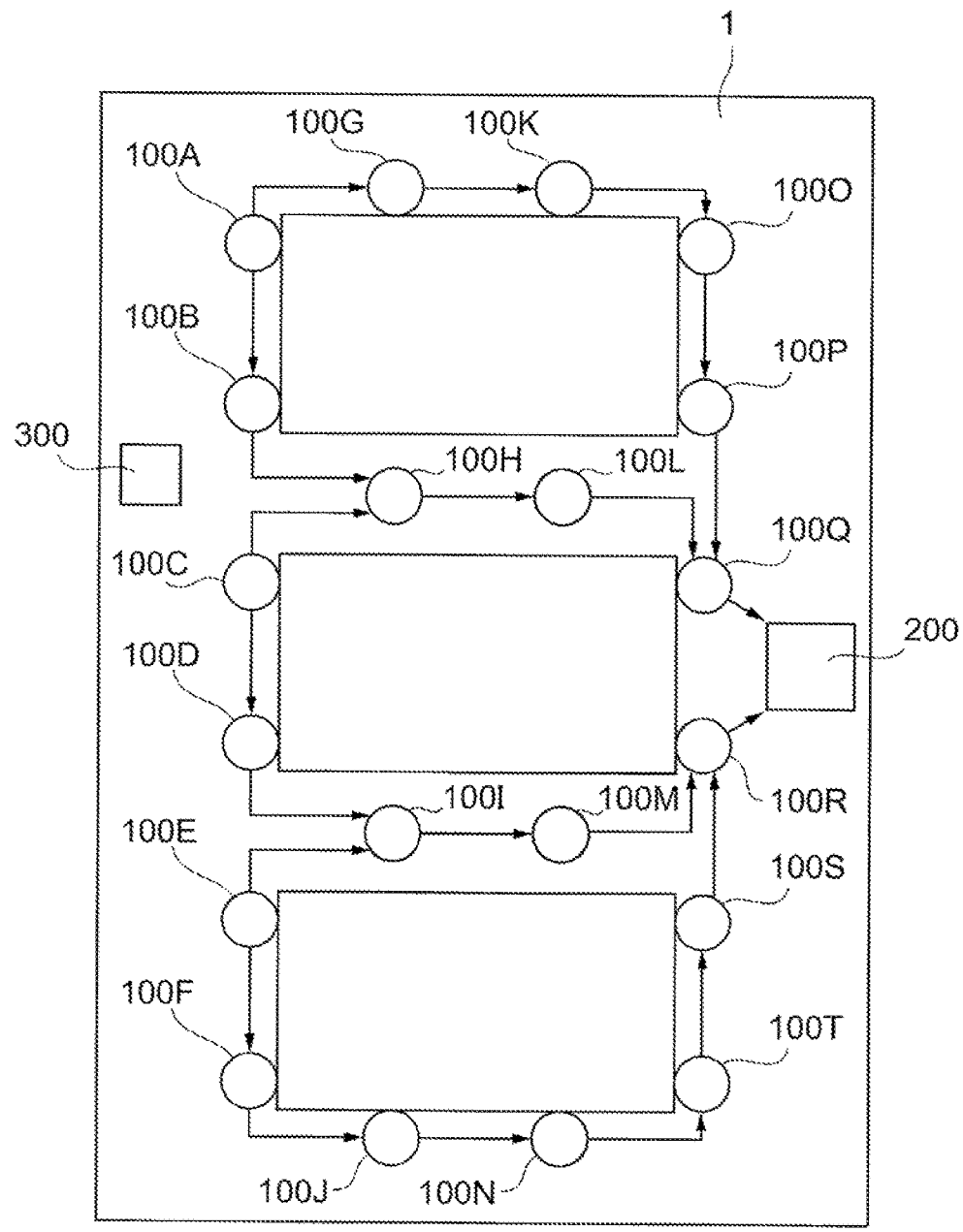
FIG. 1 is a diagram illustrating an entire configuration example of a communication system according to a first exemplary embodiment.

First, an entire configuration of a communication system 1 according to a first exemplary embodiment of the present invention will be described. FIG. 1 is a diagram illustrating an entire configuration example of a communication system 1 according to the first exemplary embodiment.

As illustrated in FIG. 1, the communication system 1 according to the exemplary embodiment includes plural communication apparatuses 100A to 100T, a management server 200, and a transmitter 300. Herein, although the positions of the communication apparatuses 100A to 100T and the management server 200 are fixed, the transmitter 300 is attached to a user or an object, and as a result, the transmitter 300 also moves as the user or the object moves.

In FIG. 1, the communication apparatuses 100A to 100T are illustrated. If it is unnecessary to distinguish the communication apparatuses 100A to 100T from each other, the communication apparatuses 100A to 100T may be referred to as the communication apparatus 100. Twenty communication apparatuses 100 are illustrated in FIG. 1. It should be noted that the number of communication apparatuses 100 is not limited to 20 as illustrated.

As an example of a receiver, the communication apparatuses 100A to 100T are communication apparatuses which perform wireless communication with other apparatus. More specifically, the communication apparatus 100 has an antenna and for example, the communication apparatus 100 is disposed on an indoor wall. In addition, the communication apparatus 100 receives a radio wave transmitted by the transmitter 300 through the antenna to measure a radio wave strength of the received radio wave. Further, the communication apparatus 100 periodically transmits data of the measured radio wave strength to, for example, the management server 200. In this case, the lowest value of the radio wave strength measured by the communication apparatus 100 is set as a value of a detection limit by the communication apparatus 100.

The management server 200 is a computer apparatus that receives the data transmitted from each communication apparatus 100. As the management server 200, for example, a PC, a workstation, etc., are exemplified. Further, the management server 200 stores information (positional information) of a position at which each communication apparatus 100 is installed.

More specifically, the management server 200 collects, from each communication apparatus 100, the data of the radio wave strength (that is, the radio wave strength of the transmitter 300, which is received by each communication apparatus 100) measured by each communication apparatus 100. In addition, the position of the transmitter 300 is specified based on the positional information of each communication apparatus 100 and the data of the radio wave strength measured by each communication apparatus 100.

The transmitter 300 transmits the radio wave to the surrounding of the own apparatus (transmitter 300), for example, at a predetermined period. It may be exemplified that as the transmitter 300, for example, a technology of iBeacon (registered trademark) is used. As described above, the transmitter 300 also moves as the user possessing the transmitter 300 or the object to which the transmitter 300 is attached moves.

Herein, it is assumed that mutual pairing of the communication apparatuses 100A to 100T and the management server 200 is completed. The pairing represents a technology used in, for example, Bluetooth (registered trademark) and represents an access configuration of the wireless communication of two apparatuses. An access of the wireless communication such as Bluetooth, etc., between the paired apparatuses is established.

In the exemplary embodiment, each communication apparatus 100 performs the wireless communication with other apparatus (the communication apparatus 100 or the management server 200) paired therewith. For example, the pairing is completed, and as a result, the communication apparatus 100H transmits/receives the data to/from other communication apparatus 100 as indicated by an arrow illustrated in FIG. 1. In other words, the communication apparatus 100H is paired with the communication apparatus 100B, the communication apparatus 100C, and the communication apparatus 100L. In addition, the communication apparatus 100H receives the data from the communication apparatus 100B and the communication apparatus 100C or transmits the data to the communication apparatus 100L.

In more detail, in the exemplary embodiment, the network of the wireless communication configured with the communication apparatuses 100A to 100T and the management server 200 is a mesh network in which the respective apparatuses are linked with each other to perform the wireless communication. Each communication apparatus 100 communicates with the management server 200 through another communication apparatus 100. In other words, each communication apparatus 100 relays the data transmitted from another communication apparatus 100 and transmits the relayed data to the management server 200. For example, when the communication apparatus 100H transmits the data to the management server 200, the data is transmitted to the management server 200 through the communication apparatus 100L and the communication apparatus 100Q. Further, the communication apparatus 100Q and the communication apparatus 100R directly transmit the data to the management server 200 not through another communication apparatus 100.

Hardware Configuration of Management Server 200

Figure 2:
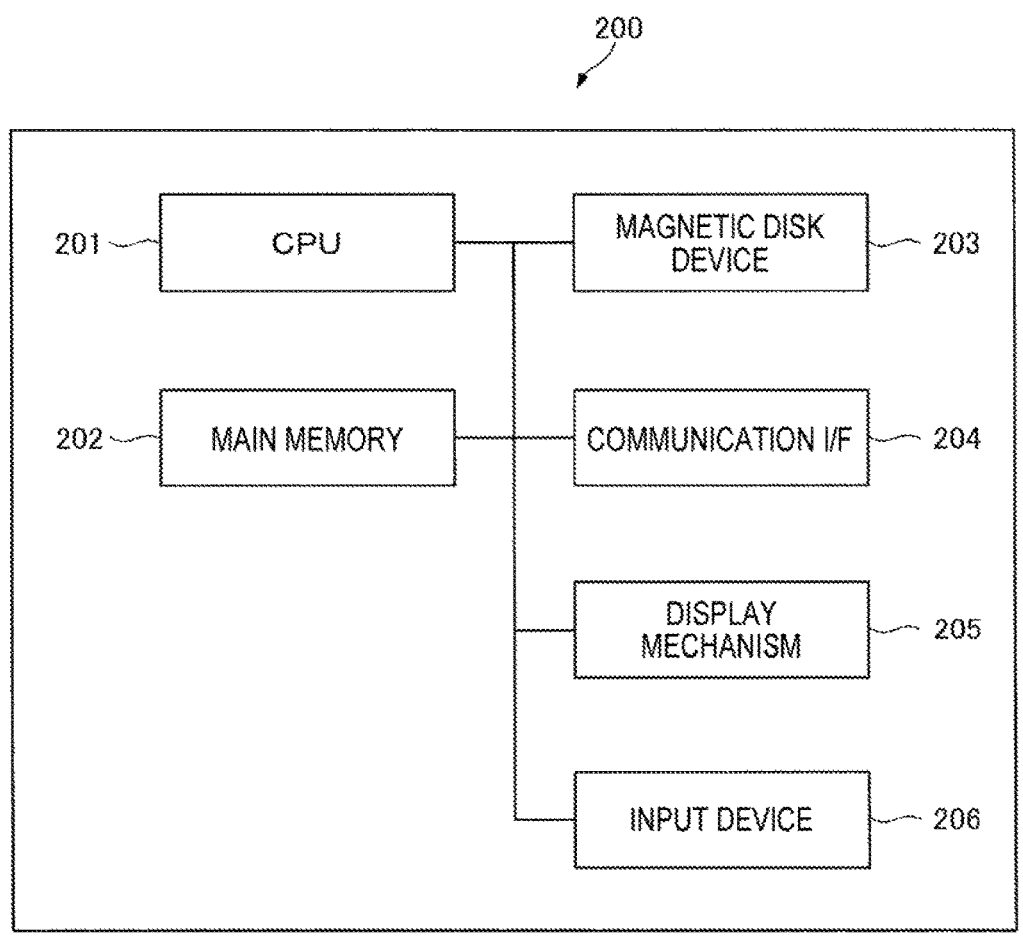
FIG. 2 is a diagram illustrating a hardware configuration example of a management server according to the first exemplary embodiment.

Subsequently, the hardware configuration of the management server 200 according to the exemplary embodiment is described. FIG. 2 is a diagram illustrating a hardware configuration example of the management server 200 according to the first exemplary embodiment. As illustrated in FIG. 2, the management server 200 includes a central processing unit (CPU) 201 as an operation section, and a main memory 202 and a magnetic disk device 203 which serve as storage units.

Herein, the CPU 201 executes various programs such as an operating system (OS) or an application to implement various functions of the management server 200. Further, the main memory 202 is a storage area that stores various programs or data used for executing the programs. In addition, the magnetic disk device 203 is a storage area that stores data input to various programs or data output from various programs. Further, for example, the CPU 201 loads various programs memorized in the magnetic disk device 203 to the main memory 202 and executes the loaded programs to implement each function of the management server 200.

The management server 200 includes a communication interface (communication I/F) 204 for communication with the outside, a display mechanism 205 configured with a video memory and a display, and an input device 206 such as an operation button or a keyboard or a mouse. Further, the communication I/F 204 serves as the communication interface that transmits/receives various data to/from the communication apparatus 100 with the antenna for performing the wireless communication.

Meanwhile, FIG. 2 just exemplifies the hardware configuration of the management server 200 suitable for application of the exemplary embodiment and the exemplary embodiment is not implemented only in the illustrated configuration.

Even as the hardware configuration of the communication apparatus 100, a configuration which is common to the hardware configuration of the management server 200 illustrated in FIG. 2 may be used.

Functional Configuration of Management Server

Figure 3:
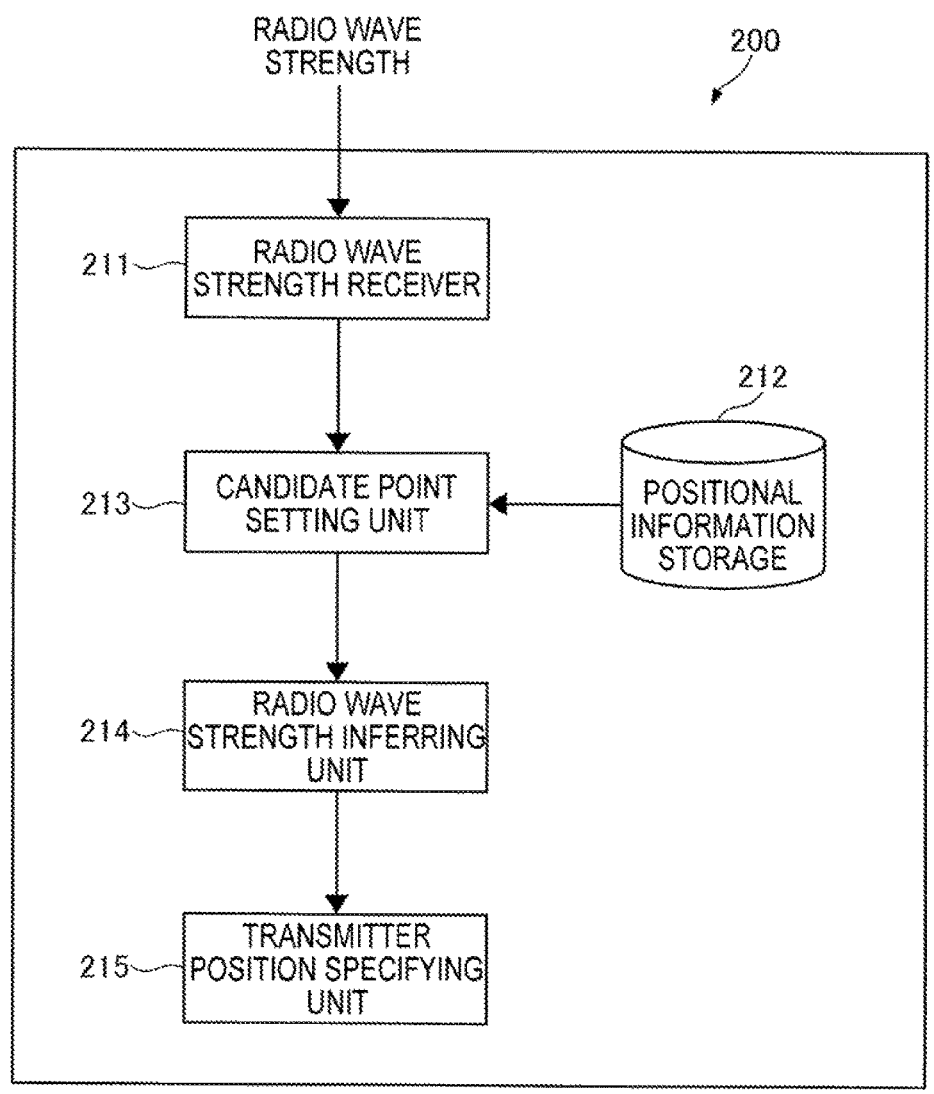
FIG. 3 is a block diagram illustrating a functional configuration example of the management server according to the first exemplary embodiment.

Subsequently, the functional configuration of the management server 200 according to the first exemplary embodiment is described. FIG. 3 is a block diagram illustrating a functional configuration example of the management server 200 according to the first exemplary embodiment. The management server 200 according to the exemplary embodiment includes a radio wave strength receiver 211, a positional information storage 212, a candidate point setting unit 213, a radio wave strength inferring unit 214, and a transmitter position specifying unit 215.

The radio wave strength receiver 211 receives data indicating the radio wave strength measured by each communication apparatus 100, in other words, data indicating the radio wave strength of the transmitter 300, which is actually received by each communication apparatus 100. Further, the radio wave strength receiver 211 receives the data of the radio wave strength measured by the communication apparatuses 100A to 100T from the communication apparatus 100Q and the communication apparatus 100R which are configured to access the management server 200 by the pairing.

The positional information storage 212 stores information (positional information) of a position at which each communication apparatus 100 is installed. As the positional information, for example, coordinates of a latitude and a longitude may be exemplified.

The candidate point setting unit 213 as an example of a setting unit sets a candidate point which is a candidate of a position at which the transmitter 300 exists. Herein, the candidate point setting unit 213 selects one communication apparatus 100 from the communication apparatuses 100 that receive the radio waves from the transmitter 300 based on the data of the radio wave strength measured by each communication apparatus 100. In addition, the candidate point setting unit 213 acquires the positional information of the selected communication apparatus 100 from the positional information storage 212 and sets plural candidate points based on the acquired positional information. Further, the candidate point setting unit 213 determines that the communication apparatus 100 receives the radio wave from the transmitter 300 when the radio wave strength received from the communication apparatus 100 is more than a detection limit value.

More specifically, the candidate point setting unit 213 selects, for example, a communication apparatus 100 having the largest radio wave strength of the radio wave received from the transmitter 300 from among the communication apparatuses 100 that receive the radio waves from the transmitter 300. In addition, the candidate point setting unit 213 calculates a distance between the selected communication apparatus 100 and the transmitter 300 and sets the plural candidate points based on the calculated distance.

Herein, the distance between the communication apparatus 100 and the transmitter 300 is calculated by Equation 1 given below.

The Equation 1 is generally called Friis transmission equation. In the Equation 1, Power represents the strength of the radio wave transmitted by the transmitter 300 and the unit of the Power is decibel meter (dBm). The Power is a value determined according to a model or settings of the transmitter 300 and is previously stored in the management server 200. A received signal strength indication (RSSI) represents the strength of the radio wave actually received by the communication apparatus 100 and the unit of the RSSI is dBm. n represents a constant associated with a radio wave characteristic of a space and for example, as an ideal value, n=2 is used.

The strength value (RSSI) of the radio wave received by the communication apparatus 100, the value of the Power, and the value of n are substituted in the Equation 1, and as a result, the value of a distance d between the communication apparatus 100 and the transmitter 300 is calculated. Further, the value of a distance d calculated herein may be determined as the value of the distance inferred from the strength of the radio wave received by the communication apparatus 100.

$$d = 10^{(Power-RSSI)/(10n)} \qquad \text{[Equation 1]}$$

The radio wave strength inferring unit 214 calculates the strength of the radio wave which is inferred to be received by each communication apparatus 100 when it is assumed that the transmitter 300 exists at the candidate point, based on the positional information of the candidate point set by the candidate point setting unit 213 and the positional information of each communication apparatus 100. The radio wave strength is calculated by the Equation 1 for each of plural candidate points set by the candidate point setting unit 213.

More specifically, the radio wave strength inferring unit 214 first selects one candidate point from the plural candidate points set by the candidate point setting unit 213. Subsequently, the radio wave strength inferring unit 214 calculates the distance between the candidate point and each communication apparatus 100 based on the positional information of the selected candidate point and the positional information of each communication apparatus 100 which receives the radio wave from the transmitter 300.

Subsequently, the radio wave strength inferring unit 214 calculates, from the calculated distance, the strength of the radio wave which is inferred to be received by each communication apparatus 100 at the distance from the transmitter 300. In other words, the radio wave strength inferring unit 214 calculates, from the calculated distance, the strength of the radio wave which is inferred to be received by each communication apparatus 100 from the transmitter 300 when it is assumed that the transmitter 300 exists at the selected candidate point. Herein, the calculated value of the distance d between the candidate point and the communication apparatus 100, a value of the Power, and a value of n are substituted in the Equation 1 given above, and as a result, the value (RSSI) of the strength of the radio wave which is inferred to be received by the communication apparatus 100 from the transmitter 300 is calculated.

As an example of a specifying unit, the transmitter position specifying unit 215 specifies the candidate point anticipated as the position of the transmitter 300 from among the plural candidate points based on the radio wave strength measured by each communication apparatus 100 and the radio wave strength inferred by the radio wave strength inferring unit 214.

More specifically, the transmitter position specifying unit 215 compares the radio wave strength measured by each communication apparatus 100 and the radio wave strength inferred by the radio wave strength inferring unit 214 for each of plural candidate points to calculate the similarity between both sides. In addition, the transmitter position specifying unit 215 evaluates the similarities calculated for the plural respective candidate points to specify a candidate point for which the similarity meets a predetermined condition, in other words, a candidate point having the highest similarity as the position of the transmitter 300. The similarity is evaluated by using a technique in the related art, which evaluates the similarity of a vector and for example, a correlation coefficient, the sum of absolute difference (SAD), the sum of squared difference (SSD), or the like are used.

Software and hardware resources cooperate with each other to implement each functional unit constituting the management server 200 illustrated in FIG. 3. Specifically, when the management server 200 is implemented by a hardware configuration illustrated in FIG. 2, for example, the program of the OS or the application program stored in the magnetic disk device 203 is read by the main memory 202 and executed by the CPU 201, and as a result, respective functions of the radio wave strength receiver 211, the candidate point setting unit 213, the radio wave strength inferring unit 214, the transmitter position specifying unit 215, and the like are implemented. Further, the positional information storage 212 is implemented by a storage unit such as the magnetic disk device 203.

Similarly, the software and hardware resources cooperate with each other to implement even the functional unit of each communication apparatus 100. Specifically, when each communication apparatus 100 is implemented by the hardware configuration illustrated in FIG. 2, for example, the program of the OS or the application program stored in the magnetic disk device 203 is read by the main memory 202 and executed by the CPU 201, and as a result, the radio wave transmitted by the transmitter 300 is received and the radio wave strength of the received radio wave is measured to transmit data of the measured radio wave strength to the management server 200.

Specific Example of Processing of Management Server

Figure 4:
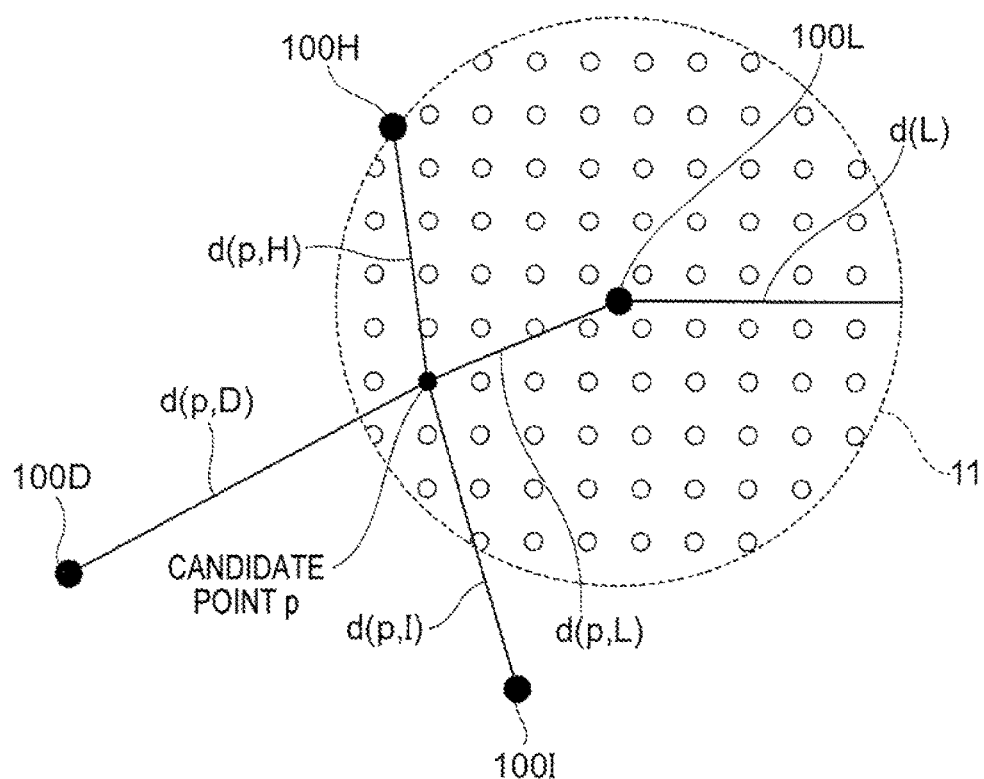
FIG. 4 is a diagram for describing a specific example of processing in which the management server specifies a position of a transmitter.

Subsequently, processing in which the management server 200 specifies the position of the transmitter 300 according to the exemplary embodiment is described by using a specific example. FIG. 4 is a diagram for describing a specific example of specifying a position in which the management server 200 specifies the position of the transmitter 300. In the example illustrated in FIG. 4, it is assumed that the user possesses the transmitter 300 and the transmitter 300 also moves as the user moves.

Each communication apparatus 100 receives the radio wave transmitted by the transmitter 300. In addition, each communication apparatus 100 measures the radio wave strength of the received radio wave to transmit the data of the measured radio wave strength to the management server 200. The radio wave strength receiver 211 of the management server 200 receives the data of the radio wave strength measured by each communication apparatus 100.

Next, subsequent processing is changed depending on the number of communication apparatuses 100 that receive the radio waves from the transmitter 300. In the example illustrated in FIG. 4, description will be given on the assumption that three or more communication apparatuses 100 receive the radio waves from the transmitter 300. In the illustrated example, as the communication apparatus 100 that receives the radio wave from the transmitter 300, four communication apparatuses including the communication apparatus 100D, the communication apparatus 100H, the communication apparatus 100I, and the communication apparatus 100L are provided. Further, the radio wave strengths of the radio waves received by the communication apparatus 100D, the communication apparatus 100H, the communication apparatus 100I, and the communication apparatus 100L are referred to as R(D), R(H), R(I), and R(L), respectively.

Subsequently, the candidate point setting unit 213 selects one communication apparatus 100 from the four communication apparatuses 100 that receive the radio waves from the transmitter 300 based on the data of the radio wave strength that the radio wave strength receiver 211 receives from each communication apparatus 100. Herein, for example, the candidate point setting unit 213 selects the communication apparatus 100 having the highest strength of the radio wave received from the transmitter 300. In the example illustrated in FIG. 4, the communication apparatus 100L is selected.

Subsequently, the candidate point setting unit 213 substitutes the strength R(L) of the radio wave received by the selected communication apparatus 100L in the Equation 1 given above to calculate the distance d between the communication apparatus 100L and the transmitter 300. Herein, the calculated distance d is referred to as d(L).

Subsequently, the candidate point setting unit 213 sets the plural candidate points based on the calculated distance d(L). Herein, the candidate point setting unit 213 sets a circle 11 having a radius d(L) around the position of the communication apparatus 100L. In addition, the candidate point setting unit 213 sets the plural candidate points, for example, at a regular interval in the circle 11 including the circumference of the circle. The number of candidate points set herein is determined according to an interval between the candidate points and the plural candidate points are set so that the interval between the candidate points becomes, for example, 50 cm. Further, the interval between the candidate points may be set so that the number of candidate points becomes approximately 100.

The positional information of the communication apparatus 100L is acquired from the positional information storage 212. Moreover, the positional information is calculated for each of plural candidate points.

Subsequently, the radio wave strength inferring unit 214 selects one candidate point from the plural candidate points set by the candidate point setting unit 213. In the example illustrated in FIG. 4, a candidate point p is selected. Subsequently, the radio wave strength inferring unit 214 calculates the distance between the candidate point p and each communication apparatus 100 based on the positional information of the selected candidate point p and the positional information of each communication apparatus 100 which receives the radio wave from the transmitter 300. In the example illustrated in FIG. 4, a distance $d(p, D)$ between the candidate point p and the communication apparatus 100D, a distance $d(p, H)$ between the candidate point p and the communication apparatus 100H, a distance $d(p, I)$ between the candidate point p and the communication apparatus 100I, and a distance $d(p, L)$ between the candidate point p and the communication apparatus 100L are calculated.

Subsequently, the radio wave strength inferring unit 214 substitutes the distance calculated with respect to each communication apparatus 100 in the Equation 1 given above to calculate the strength of the radio wave which is inferred to be received by each communication apparatus 100 at the distance from the transmitter 300. For example, $d(p, D)$ is substituted in the Equation 1, and as a result, the strength of the radio wave which is inferred to be received by the communication apparatus 100D from the transmitter 300 when it is assumed that the transmitter 300 exists at the candidate point p is calculated. The strength of the radio wave calculated herein is referred to as S(p, D). S(p, H), S(p, I), S (p, L) are calculated similarly even with respect to the communication apparatus 100H, the communication apparatus 100I, and the communication apparatus 100L.

Subsequently, the transmitter position specifying unit 215 compares the strengths R(D), R(H), R(I), and R(L) of the radio waves actually received by the communication apparatus 100D, the communication apparatus 100H, the communication apparatus 100I, and the communication apparatus 100L and the strengths S(p, D), S(p, H), S(p, I), and S(p, L) of the radio waves inferred by the radio wave strength inferring unit 214 with each other to calculate the similarities. In further description, the transmitter position specifying unit 215 calculates the similarities between the vectors R(D), R(H), R(I), and R(L) and the vectors S(p, D), S(p, H), S(p, I), and S(p, L).

As such, the similarity is calculated at the candidate point p. The transmitter position specifying unit 215 calculates the similarity in the same manner even with respect to another candidate point set by the candidate point setting unit 213. When the transmitter position specifying unit 215 calculates the similarities with respect to all candidate points set by the candidate point setting unit 213, the transmitter position specifying unit 215 specifies the candidate point having the highest similarity as the position of the transmitter 300.

In the aforementioned example, the candidate point setting unit 213 sets the candidate point based on the circle having the radius d(L) around the position of the communication apparatus 100L. It should be noted that the present invention is not limited to such a configuration. For example, the candidate point setting unit 213 may set the plural candidate points by setting a circle having a radius which is two times larger than d(L) or a circle having a radius with a value acquired by adding a predetermined value to d(L) as the circle 11.

In the aforementioned example, the case where three or more communication apparatuses 100 which receive the radio waves from the transmitter 300 are provided is described. Herein, when the number of communication apparatuses 100 which receive the radio wave from the transmitter 300 is one, the transmitter position specifying unit 215 regards the position of the communication apparatus 100 which receives the radio wave from the transmitter 300 as the position of the transmitter 300. In this case, the candidate point setting unit 213 may not set the candidate point.

When the number of communication apparatuses 100 that receive the radio waves from the transmitter 300 is two, the candidate point setting unit 213 selects one communication apparatus 100 of two communication apparatuses 100. For example, the candidate point setting unit 213 selects the communication apparatus 100 having the high strength of the radio wave received from the transmitter 300. Herein, it is assumed that the communication apparatus 100L is selected. Subsequently, the candidate point setting unit 213 sets the plural candidate points at the interval of 50 cm in a range within, for example, the distance d(L) (the distance between the communication apparatus 100L and the transmitter 300 calculated by the Equation 1) from the communication apparatus 100L on a straight line connecting the positions of two communication apparatuses 100. In addition, the transmitter position specifying unit 215 calculates the similarity for each of the plural candidate points to specify the candidate point having the highest similarity as the position of the transmitter 300.

Processing Sequence of Management Server

Figure 5:
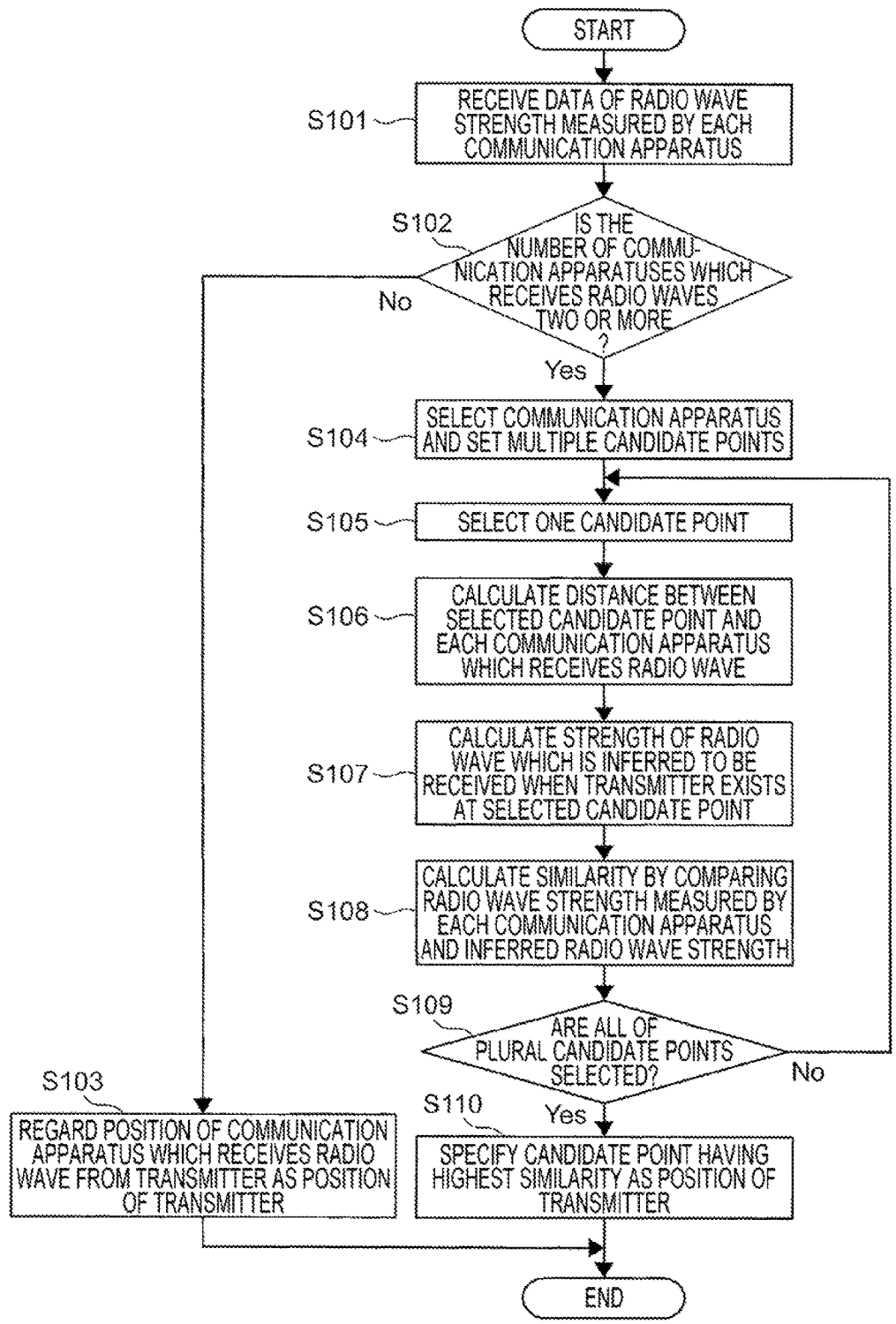
FIG. 5 is a flowchart illustrating an example of a processing sequence in which the management server specifies the position of the transmitter according to the first exemplary embodiment.

Subsequently, a processing sequence in which the management server 200 specifies the position of the transmitter 300 according to the exemplary embodiment is described. FIG. 5 is a flowchart illustrating an example of a sequence of processing in which the management server 200 specifies the position of the transmitter 300 according to the first exemplary embodiment.

First, the radio wave strength receiver 211 receives the data of the radio wave strength measured by each communication apparatus 100 (step 101). Subsequently, the candidate point setting unit 213 determines whether the number of communication apparatuses 100 which receive the radio waves from the transmitter 300 is two or more (step 102). Herein, it is determined whether the number of transmitters 300 of which the radio wave strength is more than a value of a detection limit is two or more. When a negative determination (No) is made in step 102, the transmitter position specifying unit 215 regards the position of the communication apparatus 100 which receives the radio wave from the transmitter 300 as the position of the transmitter 300 (step 103). In addition, the present processing flow ends.

Meanwhile, when a affirmative determination (Yes) is made in step 102, the candidate point setting unit 213 selects one communication apparatus 100 from the plural communication apparatuses 100 which receive the radio waves from the transmitter 300 and sets the plural candidate points (step 104). Subsequently, the radio wave strength inferring unit 214 selects one candidate point which is not yet selected from the plural candidate points (step 105). Subsequently, the radio wave strength inferring unit 214 calculates the distance between the candidate point and each communication apparatus 100 which receives the radio wave based on the positional information of the selected candidate point and the positional information of each communication apparatus 100 which receives the radio wave from the transmitter (step 106).

Subsequently, the radio wave strength inferring unit 214 calculates, from the calculated distance, the strength of the radio wave which is inferred to be received by each communication apparatus 100 from the transmitter 300 when it is assumed that the transmitter 300 exists at the selected candidate point (step S107). Subsequently, the transmitter position specifying unit 215 compares the radio wave strength measured by each communication apparatus 100 and the radio wave strength inferred by the radio wave strength inferring unit 214 to calculate the similarity between both sides (step 108). Subsequently, the transmitter position specifying unit 215 determines whether all of the plural candidate points set by the candidate point setting unit 213 are selected (step 109).

When the negative determination (No) is made in step 109, the process proceeds to step 105. Meanwhile, when the affirmative determination (Yes) is made in step 109, the transmitter position specifying unit 215 evaluates the similarity of the plural candidate points to specify the candidate point having the highest similarity as the position of the transmitter 300 (step 110). In addition, the present processing flow ends. After the present processing flow ends, the management server 200 outputs, for example, the positional information of a specific transmitter 300 with respect to an external apparatus. The user that possesses the transmitter 300 receives the positional information of the transmitter 300 by using, for example, a smart phone, etc., to determine a current position thereof.

Another Example of Processing of Management Server

Subsequently, another example of processing of the management server 200 is described. In the aforementioned example, the position of the transmitter 300 is specified based on the radio wave strength of the radio wave which each communication apparatus 100 receives from the transmitter 300. Meanwhile, in the example, the position of the transmitter 300 is specified based on not the radio wave strength but the distance calculated from the radio wave strength of the radio wave which each communication apparatus 100 receives from the transmitter 300.

Figure 6:
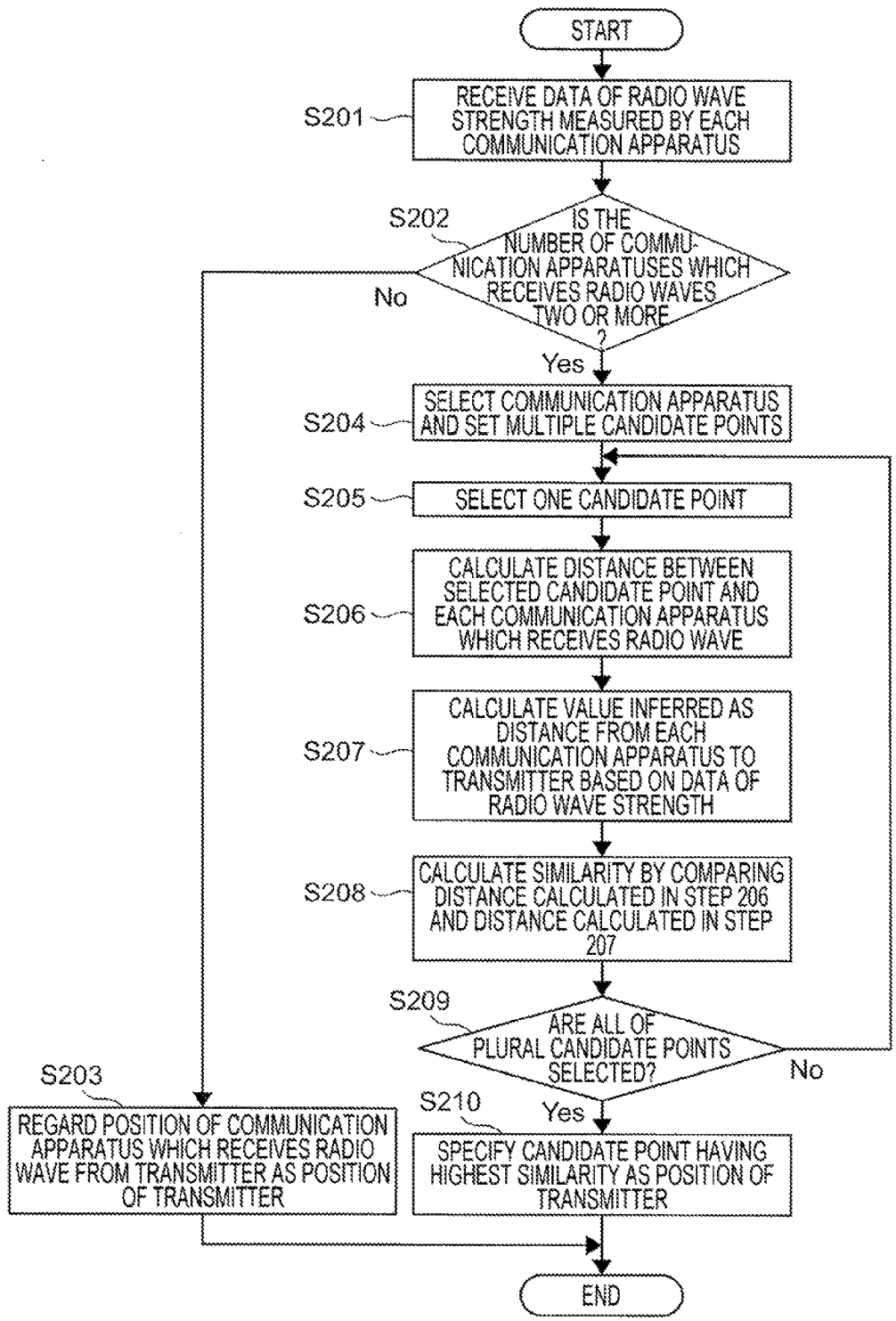
FIG. 6 is a flowchart illustrating another example of the processing sequence in which the management server specifies the position of the transmitter according to the first exemplary embodiment.

FIG. 6 is a flowchart illustrating another example of the processing sequence in which the management server 200 specifies the position of the transmitter 300 according to the first exemplary embodiment.

Since processing of steps 201 to 205 is the same as the processing of steps 101 to 105 of FIG. 5, a description thereof is omitted.

Subsequently, the radio wave strength inferring unit 214 calculates the distance between the candidate point and each communication apparatus 100 which receives the radio wave based on the positional information of the candidate point selected in step 205 and the positional information of each communication apparatus 100 which receives the radio wave from the transmitter (step 206).

Subsequently, the radio wave strength inferring unit 214 calculates a value inferred as the distance between each communication apparatus 100 and the transmitter 300 based on the data of the radio wave strength measured by each communication apparatus 100 (step 207). Herein, the radio wave strength inferring unit 214 substitutes the strength value (RSSI) of the radio wave received by each communication apparatus 100, the value of the Power, and the value of n in the Equation 1 to calculate the value of the distance d between each communication apparatus 100 and the transmitter 300.

Subsequently, the transmitter position specifying unit 215 compares the distance (the distance between the selected candidate point and each communication apparatus 100 which receives the radio wave) calculated in step 206 and the distance (the distance between each communication apparatus 100 and the transmitter 300 inferred based on the radio wave strength) calculated in step 207 to calculate the similarity (step 208). In other words, the transmitter position specifying unit 215 compares a vector of an actual distance between the candidate point and each communication apparatus 100 and the vector of the distance between the candidate point and each communication apparatus 100, which is inferred by the radio wave strength to calculate the similarity.

Subsequently, the transmitter position specifying unit 215 determines whether all of the plural candidate points set by the candidate point setting unit 213 are selected (step 209). When the negative determination (No) is made in step 209, the process proceeds to step 205. Meanwhile, when the affirmative determination (Yes) is made in step 209, the transmitter position specifying unit 215 evaluates the similarity of the plural candidate points to specify the candidate point having the highest similarity as the position of the transmitter 300 (step 210). In addition, the present processing flow ends.

In the exemplary embodiment, the transmitter position specifying unit 215 calculates the similarity of the radio wave strength by using all communication apparatuses 100 (four communication apparatuses 100 in the example illustrated in FIG. 4) that receive the radio waves from the transmitter 300. It should be noted that the present invention is not limited to such a configuration. For example, the transmitter position specifying unit 215 may calculate the similarity by using some communication apparatuses 100 among the plural communication apparatuses 100 that receive the radio waves from the transmitter 300. It should be noted that the transmitter position specifying unit 215 calculates the similarity by using one or more communication apparatuses 100 including at least a communication apparatus 100 other than the communication apparatus 100 (the communication apparatus 100L in the example illustrated in FIG. 4) selected for the candidate point setting unit 213 to set the candidate point.

The transmitter position specifying unit 215 may not use the communication apparatus 100 (the communication apparatus 100L in the example illustrated in FIG. 4) selected for the candidate point setting unit 213 to set the candidate point in calculating the similarity. Moreover, the transmitter position specifying unit 215 may calculate the similarity by using the communication apparatus 100 which has not received the radio wave from the transmitter 300, in other words, the communication apparatus 100 in which the radio wave strength of the radio wave received from the communication apparatus 100 shows the value of the detection limit. In this case, as the number of communication apparatuses 100 used for calculating the similarity increases, a possibility that an accurate position of the transmitter 300 will be specified increases.

In the exemplary embodiment, since pairing each communication apparatus 100 and the management server 200 is completed, for example, high-speed communication is available as compared with Bluetooth low energy (BLE) of which pairing is not required. Therefore, in wireless communication in each communication apparatus 100 and the management server 200, for example, communication of massive data such as an image captured by a camera or audio data is realized. In the exemplary embodiment, the communication apparatuses 100A to 100T and the management server 200 may specify the position of the transmitter 300 by transmitting and receiving data by using, for example, the BLE of which pairing is not required, etc.

Second Exemplary Embodiment

Entire Configuration

Figure 7:
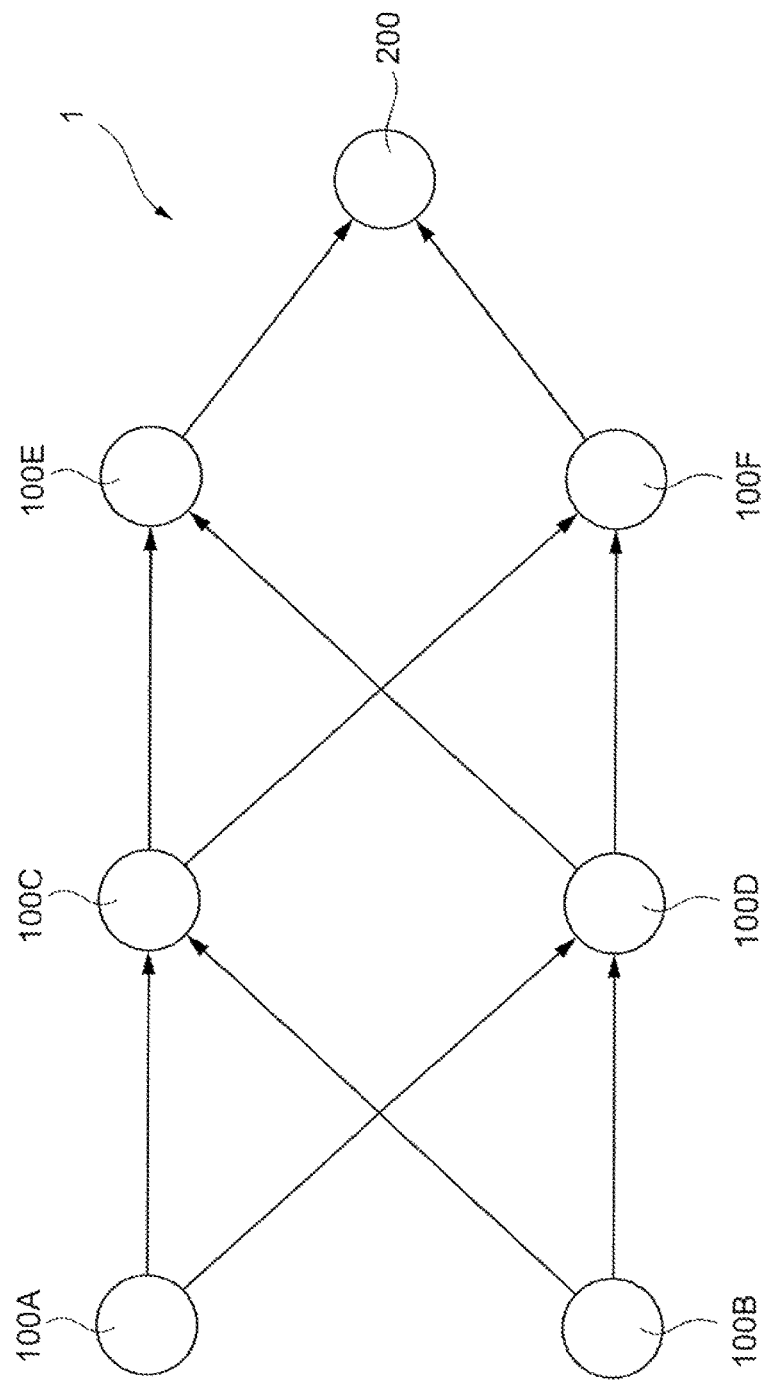
FIG. 7 is a diagram illustrating an entire configuration example of a communication system according to a second exemplary embodiment.

Subsequently, the entire configuration of the communication system 1 according to a second exemplary embodiment of the present invention is described. FIG. 7 is a diagram illustrating an entire configuration example of a communication system 1 according to the second exemplary embodiment.

As illustrated in FIG. 7, the communication system 1 according to the exemplary embodiment includes plural communication apparatuses 100A to 100F and a management server 200 as an example of an information processing apparatus. Meanwhile, six communication apparatuses 100 are illustrated in FIG. 7. It should be noted that the number of communication apparatuses 100 is not limited to six as illustrated. Further, the hardware configuration example of the communication apparatus 100 and the management server 200 according to the exemplary embodiment is similar to the hardware configuration example of FIG. 2.

Herein, the network of the wireless communication configured with the communication apparatuses 100A to 100F and the management server 200 is the mesh network in which the respective apparatuses are linked with each other to perform the wireless communication similarly to the first exemplary embodiment. In the exemplary embodiment, a detour path is provided among the respective communication apparatuses 100.

For example, the communication apparatus 100A transmits data by using the communication apparatus 100C and the communication apparatus 100D as a transmitting destination. The communication apparatus 100B transmits the data by using the communication apparatus 100C and the communication apparatus 100D as the transmitting destination. The communication apparatus 100C receives the data by using the communication apparatus 100A and the communication apparatus 100B as a transmitting source and transmits the data by using the communication apparatus 100E and the communication apparatus 100F as the transmitting destination. The communication apparatus 100D receives the data by using the communication apparatus 100A and the communication apparatus 100B as the transmitting source, and transmits the data by using the communication apparatus 100E and the communication apparatus 100F as the transmitting destination. The communication apparatus 100E receives the data by using the communication apparatus 100C and the communication apparatus 100D as the transmitting source, and transmits the data by using the management server 200 as the transmitting destination. The communication apparatus 100F receives the data by using the communication apparatus 100C and the communication apparatus 100D as the transmitting source, and transmits the data by using the management server 200 as the transmitting destination. The management server 200 receives the data by using the communication apparatus 100E and the communication apparatus 100F as the transmitting source.

As such, in the exemplary embodiment, since the detour paths are provided among the respective communication apparatuses 100, even though a communication abnormality occurs between the communication apparatuses 100, the data is transmitted/received by using the detour path.

Figure 8:
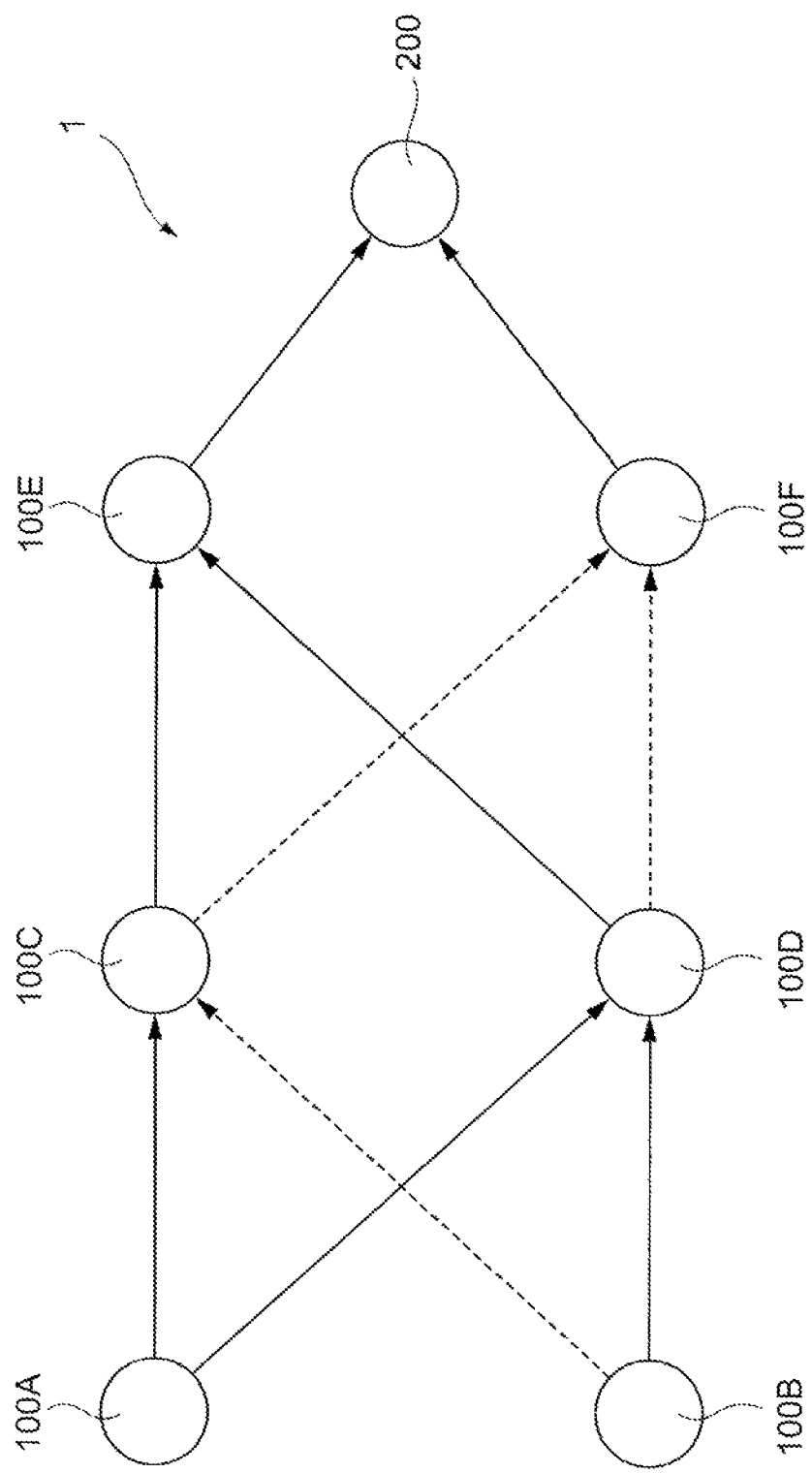
FIG. 8 is a diagram for describing an example of the case where communication abnormality occurs between communication apparatuses.

FIG. 8 is a diagram for describing an example of the case where the communication abnormality occurs between the communication apparatuses 100. For example, it is assumed that the respective communication I/Fs of the communication apparatuses 100B to 100D are in failure. As a result, abnormality occurs in the communication of a path indicated by dotted lines in FIG. 8, that is, each of the communication between the communication apparatuses 100B and 100C, the communication between the communication apparatuses 100C and 100F, and the communication between the communication apparatuses 100D and 100F.

Herein, the case where the communication apparatus 100B transmits the data to the management server 200 is reviewed. Since the communication abnormality occurs between the communication apparatuses 100B and 100C, the communication apparatus 100B cannot transmit the data to the communication apparatus 100C, but may transmit the data to the communication apparatus 100D. Similarly, the communication apparatus 100D cannot transmit the data to the communication apparatus 100F, but may transmit the data to the communication apparatus 100E. As a result, the data from the communication apparatus 100B is transmitted to the management server 200 through the communication apparatuses 100D and 100E.

As such, in the exemplary embodiment, even though the communication abnormality occurs between the apparatuses, the data is normally transmitted to the management server 200 by using the detour path. It is desirable to detect that the communication abnormality occurs in the network. Therefore, in the exemplary embodiment, each communication apparatus 100 transmits information for detecting the communication abnormality to the management server 200. In addition, the management server 200 determines whether the communication abnormality occurs in the network based on the information transmitted from each communication apparatus 100.

Functional Configuration of Communication Apparatus

Figure 9:
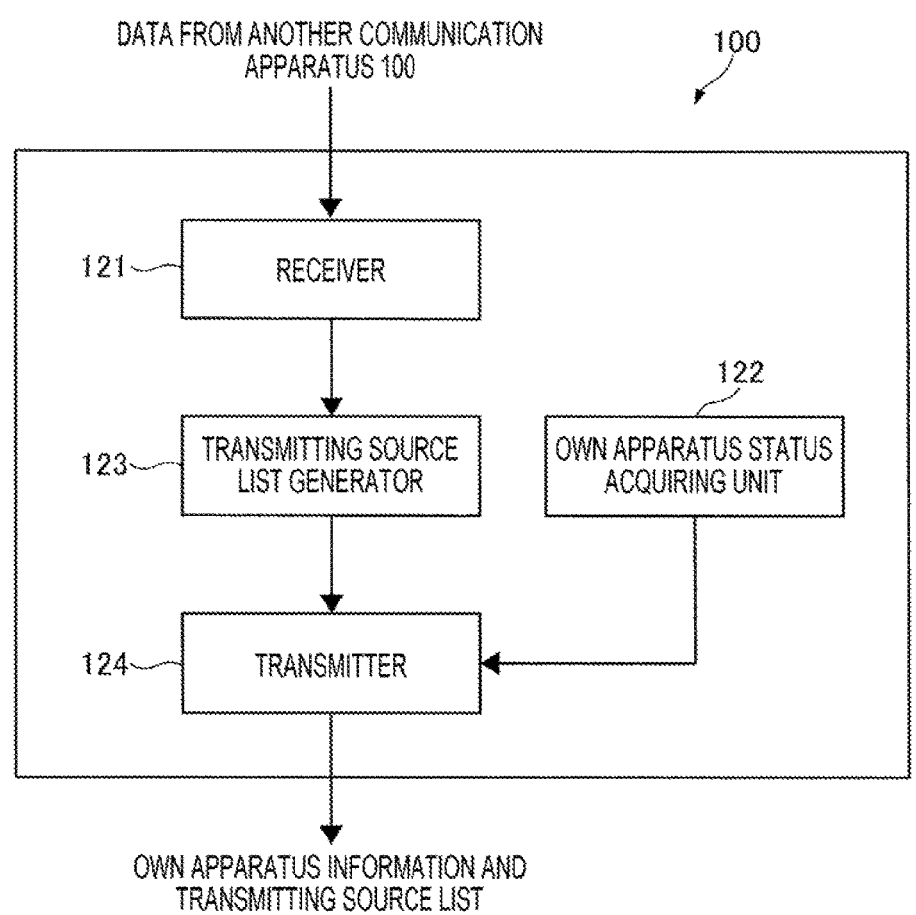
FIG. 9 is a block diagram illustrating a functional configuration example of the communication apparatus according to the second exemplary embodiment.

Subsequently, a functional configuration of the communication apparatus 100 according to the second exemplary embodiment is described. FIG. 9 is a block diagram illustrating a functional configuration example of the communication apparatus 100 according to the second exemplary embodiment. The communication apparatus 100 according to the exemplary embodiment includes a receiver 121, an own apparatus status acquiring unit 122, a transmitting source list generator 123, and a transmitter 124.

The receiver 121 as an example of a receiver receives data from the communication apparatus 100 which is a predetermined transmitting source through the wireless communication. For example, the receiver 121 of the communication apparatus 100E receives the data from the communication apparatus 100C and the communication apparatus 100D.

The own apparatus status acquiring unit 122 acquires information indicating a status of the own apparatus from the own apparatus periodically, for example, every 1 minute. As the information indicating the status of the own apparatus, for example, information such as the status (whether each unit normally operates) of each unit constituting the own apparatus, an error which occurs in the own apparatus, and a residual battery amount of the own apparatus is exemplified. Hereinafter, the information indicating the status of the own apparatus will be referred to as 'own apparatus information'.

The transmitting source list generator 123 generates a list (hereinafter, referred to as a transmitting source list) of the communication apparatus 100 which is the transmitting source of the data received within a predetermined time (within a specific period), for example, for 1 minute. More specifically, the transmitting source list generator 123 stores the communication apparatus 100 which is the transmitting source of the data whenever the receiver 121 receives the data within the predetermined time. In addition, when the predetermined time elapsed, the transmitting source list generator 123 generates the transmitting source list based on information of the stored transmitting source.

Herein, the communication apparatus 100 of the transmitting source included in the transmitting source list is set as a communication apparatus 100 of a counterpart with which the receiver 121 directly communicates. For example, in the case of the communication apparatus 100E, the communication apparatus 100C or the communication apparatus 100D is included in the transmitting source list. Additionally, the communication apparatus 100E may receive the data which the communication apparatus 100A or the communication apparatus 100B transmits through the communication apparatus 100C. The transmitting source (the communication apparatus 100A or the communication apparatus 100B) of indirect communication (communication through the communication apparatus 100C) is not included in the transmitting source list.

The transmitter 124 as an example of a transmitter transmits the data to the communication apparatus 100 or the management server 200 at a predetermined transmitting destination through the wireless communication. Further, when the number of predetermined transmitting destinations is two or more, the transmitter 124 transmits the data to the plural respective transmitting destinations. The data transmitted to the predetermined transmitting destination includes the own apparatus information acquired by the own apparatus status acquiring unit 122 and the transmitting source list generated by the transmitting source list generator 123. The transmitter 124 transmits the own apparatus information and the transmitting source list to the predetermined transmitting destination by using the management server 200 as the receiving destination periodically such as, for example, every 1 minute. Further, the transmitter 124 transmits, to the predetermined transmitting destination, even the own apparatus information and the transmitting source list of another communication apparatus 100 transmitted from another communication apparatus 100.

For example, the transmitter 124 of the communication apparatus 100C transmits the own apparatus information and the transmitting source list of the communication apparatus 100C to the communication apparatuses 100E and 100F by using the management server 200 as the receiving destination. Further, when the receiver 121 receives the own apparatus information and the transmitting source list of the communication apparatus 100A, the communication apparatus 100B, etc., the transmitter 124 transmits even the own apparatus information and the transmitting source lists of other communication apparatuses 100 to the communication apparatuses 100E and 100F by using the management server 200 as the receiving destination.

For example, the transmitter 124 of the communication apparatus 100E transmits the own apparatus information and the transmitting source list of the communication apparatus 100E to the management server 200. Further, when the receiver 121 receives the own apparatus information and the transmitting source list of the communication apparatus 100A, the communication apparatus 100B, the communication apparatus 100C, the communication apparatus 100D, etc., the transmitter 124 transmits even the own apparatus information and the transmitting source lists of the other communication apparatuses 100 to the management server 200.

Similarly to the first exemplary embodiment, the software and hardware resources cooperate with each other to implement each functional unit constituting the communication apparatus 100 illustrated in FIG. 9. Specifically, when the communication apparatus 100 is implemented by the hardware configuration illustrated in FIG. 2, for example, the program of the OS or the application program stored in the magnetic disk device 203 is read by the main memory 202 and executed by the CPU 201, and as a result, the respective functions of the receiver 121, the own apparatus status acquiring unit 122, the transmitting source list generator 123, the transmitter 124, and the like are implemented.

Functional Configuration of Management Server

Figure 10:
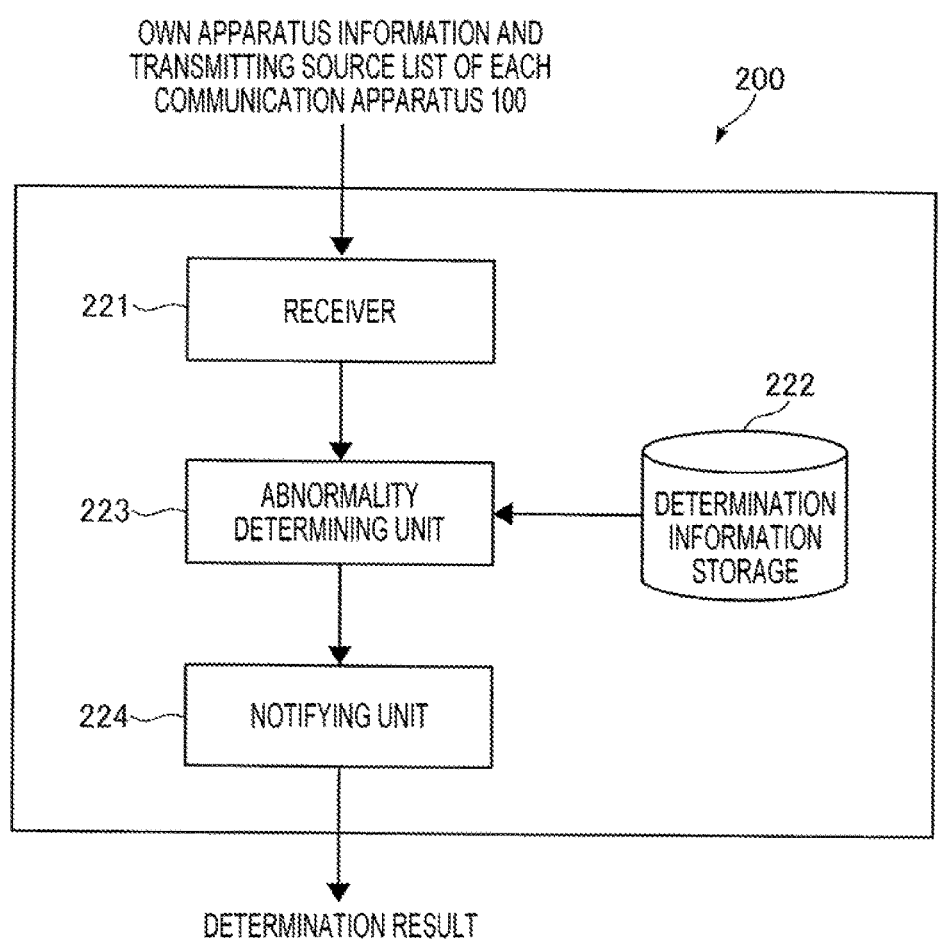
FIG. 10 is a block diagram illustrating the functional configuration example of the management server according to the second exemplary embodiment.

Subsequently, the functional configuration of the management server 200 according to the second exemplary embodiment is described. FIG. 10 is a block diagram illustrating the functional configuration example of the management server 200 according to the second exemplary embodiment. The management server 200 according to the exemplary embodiment includes a receiver 221, a determination information storage 222, an abnormality determining unit 223, and a notifying unit 224.

The receiver 221 as an example of an information receiver receives the own apparatus information and the transmitting source list of each communication apparatus 100 from a predetermined transmitting source through the wireless communication. In other words, the receiver 221 receives the own apparatus information and the transmitting source list of each communication apparatus 100 from the communication apparatuses 100E and 100F through the wireless communication.

The determination information storage 222 stores information (hereinafter, referred to as determination information) for determining whether the communication between the apparatuses is normal. FIG. 11 is a diagram illustrating an example of determination information. As illustrated in FIG. 11, the communication apparatus 100 which becomes the transmitting source is registered in the determination information when the communication is normal with respect to each communication apparatus 100. For example, the communication apparatuses 100C and 100D are registered with respect to the communication apparatus 100E. Further, the communication apparatus 100 which becomes the transmitting source is not registered in the communication apparatuses 100A and 100B.

The abnormality determining unit 223 as an example of a detector detects abnormality in the network based on the own apparatus information and the transmitting source list transmitted from each communication apparatus 100. In additional description, the abnormality determining unit 223 determines whether the abnormality occurs in the network, in other words, whether each communication apparatus 100 is normal and whether the communication between the apparatuses is normally made, based on the own apparatus information and the transmitting source list transmitted from each communication apparatus 100.

Herein, the abnormality determining unit 223 determines whether each communication apparatus 100 is normal based on the own apparatus information of each communication apparatus 100. More specifically, when own apparatus information of a certain communication apparatus 100 meets a predetermined condition, the abnormality determining unit 223 determines that the communication apparatus 100 is normal. For example, when the own apparatus information indicates that each unit of the communication apparatus 100 normally operates, that the error does not occur, and that the residual battery amount is more than a threshold, the abnormality determining unit 223 determines that the communication apparatus 100 is normal. Meanwhile, for example, when the own apparatus information includes the error indicating that the apparatus is abnormal, it is determined that the communication apparatus 100 is abnormal.

The abnormality determining unit 223 determines whether the communication between the communication apparatuses is normally made based on the transmitting source list of each communication apparatus 100. More specifically, the abnormality determining unit 223 compares the transmitting source list of each communication apparatus 100 and the determination information stored in the determination information storage 222 to determine whether the communication between the communication apparatuses is normally made.

When the abnormality determining unit 223 does not receive the own apparatus information and the transmitting source list for a predetermined time, for example, five minutes or more with respect to a predetermined communication apparatus 100, the abnormality determining unit 223 determines that the communication apparatus 100 is in failure or does not access the network or that the communication from the communication apparatus 100 to the management server 200 is abnormal, which includes even the detour path.

The notifying unit 224 notifies a determination result by the abnormality determining unit 223 to the user. For example, when it is determined the abnormality occurs in the communication apparatus 100 or it is determined that the abnormality occurs in the communication between the communication apparatuses 100, the notifying unit 224 displays the determination result on a screen or transmits the determination result to the smart phone possessed by the user to notify the determination result to the user.

The software and hardware resources cooperate with each other to implement each functional unit constituting the management server 200 illustrated in FIG. 10. Specifically, when the management server 200 is implemented by the hardware configuration illustrated in FIG. 2, for example, the program of the OS or the application program stored in the magnetic disk device 203 is read by the main memory 202 and executed by the CPU 201, and as a result, the respective functions of the receiver 221, the abnormality determining unit 223, the notifying unit 224, etc., are implemented. Further, the determination information storage 222 is implemented by the storage unit such as the magnetic disk device 203.

Specific Example of Processing of Detecting Abnormality in Network

Figure 12A:
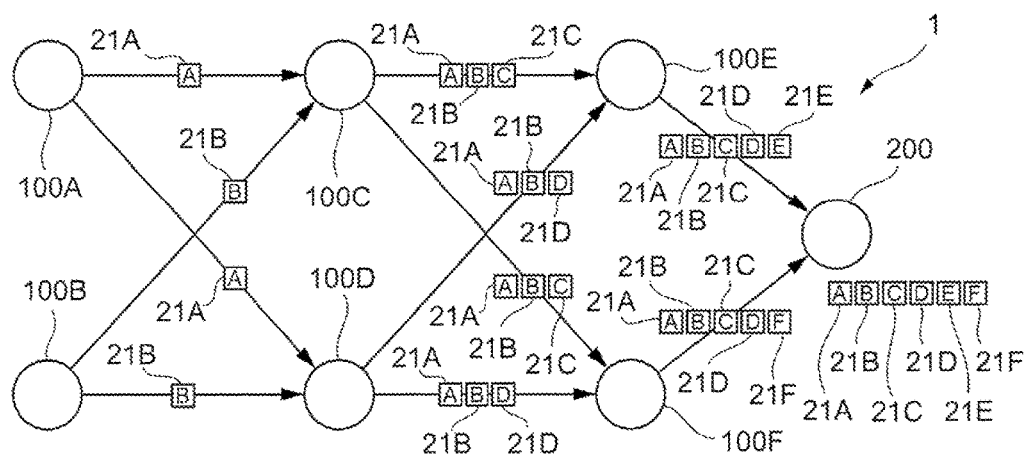
Figure 12B:
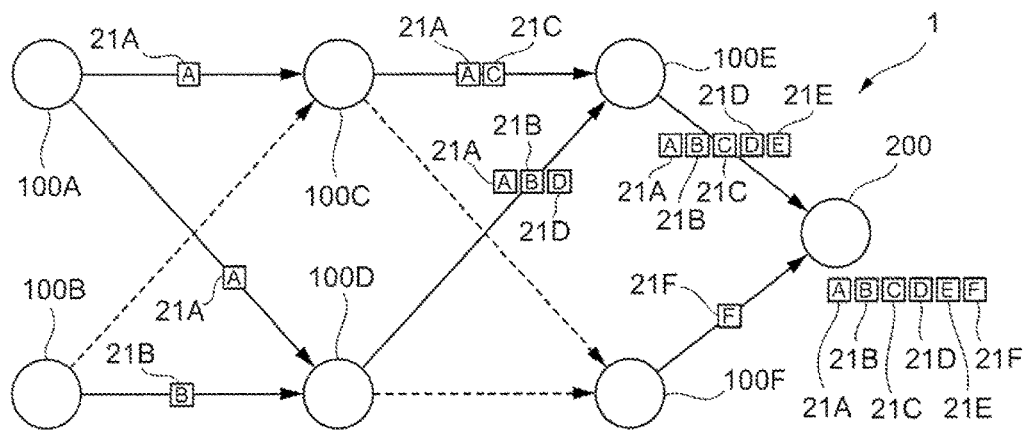

Subsequently, a processing in which the management server 200 according to the exemplary embodiment detects the abnormality in the network is described by using a specific example. FIGS. 12A to 12C are diagrams for describing a specific example of a processing in which the management server 200 detects abnormality in the network. Herein, FIG. 12A illustrates an example of the case where the communication is normally made between the communication apparatuses and FIG. 12B illustrates an example of the case where the communication abnormality between the apparatuses. In the examples illustrated in FIGS. 12A and 12B, the own apparatus information and the transmitting source lists of the communication apparatuses 100A to 100F are referred to as information 21A to 21F, respectively.

First, the transmitter 124 of each communication apparatus 100 transmits the own apparatus information and the transmitting source list periodically such as, for example, every 1 minute. For example, in the example illustrated in FIG. 12A, the communication apparatus 100A transmits the information 21A (the own apparatus information and the transmitting source list of the communication apparatus 100A) of the communication apparatus 100A to the communication apparatuses 100C and 100D. Further, for example, the communication apparatus 100C receives the information 21A from the communication apparatus 100A and receives the information 21B from the communication apparatus 100B. In addition, the communication apparatus 100C transmits the information 21A and the information 21B, and the information 21C of the communication apparatus 100C to the communication apparatuses 100E and 100F. Finally, the management server 200 receives the information 21A to 21F of the communication apparatuses 100A to 100F.

Meanwhile, in the example illustrated in FIG. 12B, the abnormality occurs in the communication of the path indicated by dotted lines, that is, each of the communication between the communication apparatuses 100B and 100C, the communication between the communication apparatuses 100C and 100F, and the communication between the communication apparatuses 100D and 100F. In this case, the management server 200 receives the information 21A to 21E from the communication apparatus 100E and receives the information 21F from the communication apparatus 100F. That is, the management server 200 receives the information 21A to 21F of the communication apparatuses 100A to 100F.

Herein, in the example illustrated in FIG. 12A, since the communication is normally made between the communication apparatuses, the transmitting source list of each communication apparatus 100 is illustrated in FIG. 11. Meanwhile, in the example illustrated in FIG. 12B, the communication abnormality occurs and the transmitting source list of each communication apparatus 100 is different from the transmitting source list in FIG. 11.

FIG. 12C is a diagram illustrating the transmitting source list of each communication apparatus 100 in the case of FIG. 12B. In FIG. 12C, the transmitting source lists of the communication apparatuses 100A, 100B, 100D, and 100E are the same as the transmitting source lists illustrated in FIG. 11.

Meanwhile, in FIG. 12C, only the communication apparatus 100A is included in the transmitting source list of the communication apparatus 100C, while the communication apparatuses 100A and 100B are included in the transmitting source list of the communication apparatus 100C in FIG. 11. Therefore, the abnormality determining unit 223 determines that the communication abnormality occurs between the communication apparatuses 100B and 100C. Further, in FIG. 12C, any communication apparatus 100 is not included in the transmitting source list of the communication apparatus 100F, while the communication apparatuses 100C and 100D are included in the transmitting source list of the communication apparatus 100F in FIG. 11. Therefore, the abnormality determining unit 223 determines that the communication abnormality occurs between the communication apparatuses 100F and 100C and between the communication apparatuses 100F and 100D. By such a configuration, the abnormality determining unit 223 determines whether the communication abnormality occurs in the network based on the information 21A to 21F of the respective communication apparatuses 100.

The abnormality determining unit 223 determines whether each communication apparatus 100 is normal based on the own apparatus information of each communication apparatus 100. In the example illustrated in FIG. 12B, the abnormality determining unit 223 determines that the communication I/F of the communication apparatus 100B is in failure based on, for example, the own apparatus information of the communication apparatus 100B.

Herein, a cause for which the communication abnormality occurs between the communication apparatuses may be, for example, a cause by the apparatus such as the failure of the apparatus or a cause by an external environment such as the case where the radio wave is not normally transmitted/received by an obstacle between the communication apparatuses. Referring to FIGS. 21A and 21B, a processing in which the management server 200 determines the abnormality cause in the network is additionally described. FIGS.

21A and 21B are diagrams for describing a specific example of a processing in which the management server 200 according to the second exemplary embodiment determines the abnormality cause in the network.

FIG. 21B illustrates a status of the communication apparatus 100C illustrated in FIG. 21A, a communication situation of a communication path 22X, the communication situation of a communication path 22Y, and contents interpreted based on the information. The communication path 22X is a communication path between the communication apparatus 100A and the communication apparatus 100C. The communication path 22Y is the communication path between the communication apparatus 100B and the communication apparatus 100C. Further, the status of the communication apparatus 100C is determined from the own apparatus information of the communication apparatus 100. In addition, the communication situations of the communication path 22X and the communication path 22Y are determined by comparing the transmitting source list of the communication apparatus 100C and the determination information of the determination information storage 222.

For example, in the case where the status of the communication apparatus 100C is 'OK (normal)' and the communication paths 22X and 22Y are 'OK', it is interpreted that the communication apparatus 100C is not abnormal ('OK'). In this case, the case where the communication paths 22X and 22Y are 'OK' represents the case where both the communication paths 22X and 22Y are 'OK'.

Meanwhile, for example, in the case where the status of the communication apparatus 100C is 'OK' and the communication paths 22X and 22Y are 'NG (abnormal)', it is determined that the abnormality occurs in the communication paths 22X and 22Y even though the communication apparatus 100C is not abnormal. In this case, it is interpreted that hindrance occurs in the communication paths 22X and 22Y due to a shield (obstacle). In this case, the case where the communication paths 22X and 22Y are 'NG' includes the case where both the communication paths 22X and 22Y are 'NG' and one of the communication paths 22X and 22Y are 'NG'.

In the case where the status of the communication apparatus 100C is 'failure of the receiver (failure of the communication I/F at a receiving side)' and the communication paths 22X and 22Y are 'OK', the communication may be normally made through the communication paths 22X and 22Y even though the communication I/F at the receiving side is in failure. In this case, it is interpreted that there is a mistake in failure diagnosis (failure diagnosis program) by the management server 200.

For example, in the case where the status of the communication apparatus 100C is 'the failure of the receiver' and the communication paths 22X and 22Y are 'NG', it is interpreted that the abnormality occurs in the communication paths 22X and 22Y because the communication I/F at the receiving side of the communication apparatus 100C is in failure.

The abnormality determining unit 223 of the management server 200 determines the abnormality cause in the network by performing the interpretation as described above by using the own apparatus information and the transmitting source list of the communication apparatus 100. For example, in the example illustrated in FIGS. 21A and 21B, even in the case where it is determined that the communication paths 22X and 22Y are 'NG' based on the transmitting source list, it is not yet determined for which cause the communication abnormality occurs from the information of the transmitting source list. Therefore, the abnormality determining unit 223 determines whether the communication abnormality occurs due to the shield on the communication path or the failure of the receiver of the communication apparatus 100C by using the own apparatus information of the communication apparatus 100C. In additional description, the abnormality determining unit 223 may more accurately determine the situation in the network as compared with a case of using only one of the own apparatus information and the transmitting source list by matching the status of the communication apparatus 100C and the communication situations of the communication paths 22X and 22Y by using both the own apparatus information and the transmitting source list of the communication apparatus 100C.

Processing Sequence of Communication Apparatus

Figure 13:
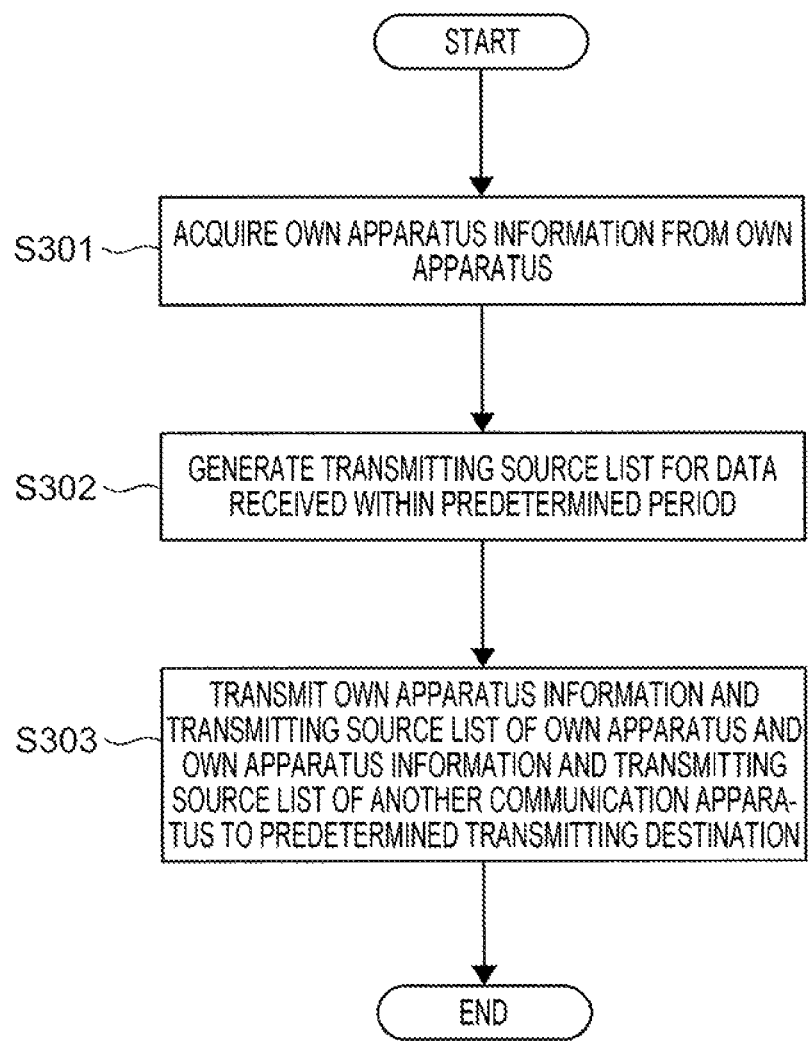
FIG. 13 is a flowchart illustrating an example of a processing sequence of the communication apparatus according to the second exemplary embodiment.

Subsequently, the processing sequence of the communication apparatus 100 according to the exemplary embodiment is described. FIG. 13 is a flowchart illustrating an example of the processing sequence of the communication apparatus 100 according to the second exemplary embodiment. The following processing is repeatedly executed periodically, for example, every 1 minute.

The own apparatus status acquiring unit 122 acquires the own apparatus information in the own apparatus (step 301). Subsequently, the transmitting source list generator 123 generates the transmitting source list based on data that the receiver 121 receives within a predetermined time, for example, for 1 minute (step 302). Subsequently, the transmitter 124 transmits, to a predetermined transmitting destination, the own apparatus information and the transmitting source list regarding the own apparatus, and the own apparatus information and the transmitting source list of another communication apparatus 100 transmitted from another communication apparatus 100 (step 303). Herein, the own apparatus information and the transmitting source list regarding the own apparatus and the own apparatus information and the transmitting source list of another communication apparatus 100 may be separately transmitted. In addition, the present processing flow ends.

Processing Sequence of Management Server

Figure 14:
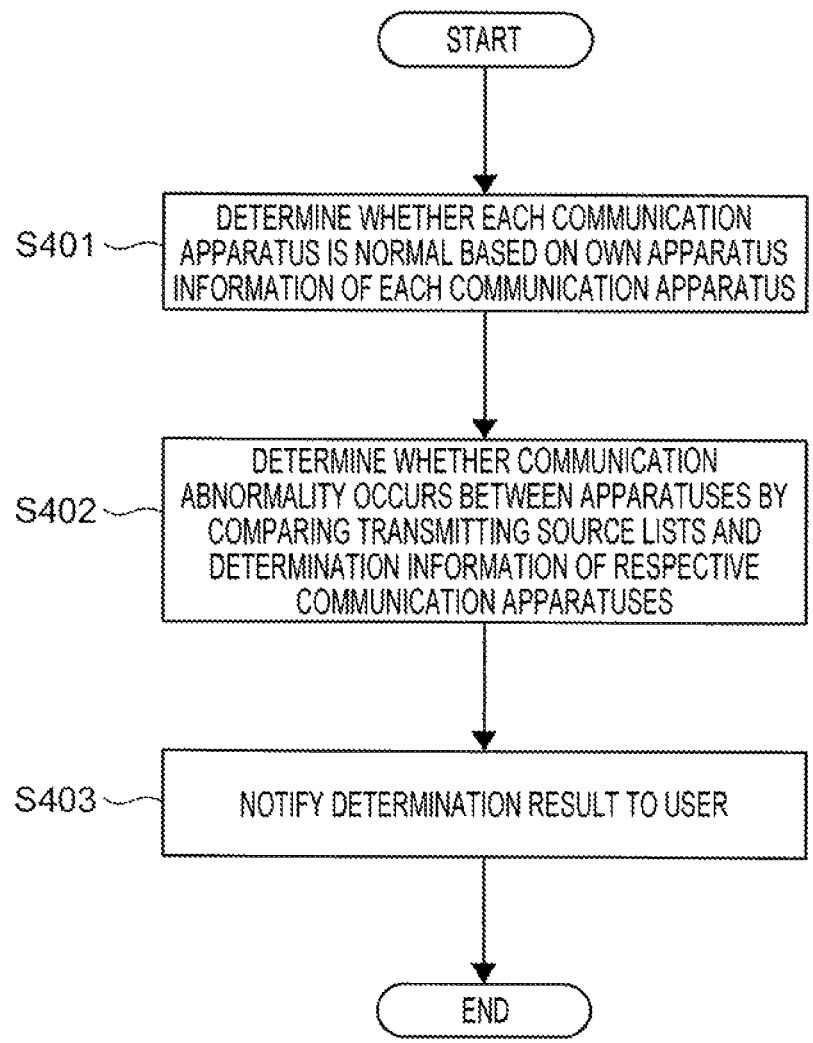
FIG. 14 is a flowchart illustrating an example of the processing sequence of the management server according to the second exemplary embodiment.

Subsequently, the processing sequence of the management server 200 according to the exemplary embodiment is described. FIG. 14 is a flowchart illustrating an example of the processing sequence of the management server 200 according to the second exemplary embodiment.

The abnormality determining unit 223 determines whether each communication apparatus 100 is normal based on the own apparatus information transmitted from each communication apparatus 100 (step 401). Subsequently, the abnormality determining unit 223 determines whether the communication abnormality occurs between the communication apparatuses by comparing the transmitting source list transmitted from each communication apparatus 100 and the determination information (step 402). Subsequently, the notifying unit 224 notifies the determination result by the abnormality determining unit 223 to the user (step 403). In addition, the present processing flow ends.

In the exemplary embodiment, the detour paths are provided among all of the communication apparatuses 100. It should be noted that the present invention is not limited to such a configuration. Even in the case where there is a section in which the detour path is not provided between the communication apparatuses 100, the abnormality determining unit 223 of the management server 200 may determine whether each communication apparatus 100 is normal and whether the communication is normally made between the communication apparatuses based on the information transmitted from each communication apparatus 100.

Third Exemplary Embodiment

Subsequently, a communication system 1 according to a third exemplary embodiment of the present invention is described. The communication system 1 according to the exemplary embodiment includes plural communication apparatuses 100A to 100F and the management server 200 similarly to FIG. 7. Further, the network of the wireless communication configured with the communication apparatuses 100A to 100F and the management server 200 is the mesh network in which the detour path is provided between the communication apparatuses 100 and the respective apparatuses are linked with each other to perform the wireless communication similarly to the second exemplary embodiment. In the exemplary embodiment, the mesh network is automatically configured based on the positions of the communication apparatuses 100A to 100F and the management server 200.

Meanwhile, six communication apparatuses 100 are illustrated in FIG. 7. It should be noted that the number of communication apparatuses 100 is not limited to six as illustrated. Further, the hardware configuration example of the communication apparatus 100 and the management server 200 according to the exemplary embodiment is similar to the hardware configuration example of FIG. 2. Hereinafter, the communication apparatuses 100A to 100F and the management server 200 may be referred to as 'node'.

Functional Configuration of Management Server

Subsequently, the functional configuration of the management server 200 according to the third exemplary embodiment is described. The management server 200 performs a processing of determining the transmitting destination and the transmitting source of each node with respect to the mesh network for transmitting various data to the management server 200 of the receiving destination by providing the detour path between the communication apparatuses 100. Herein, the management server 200 classifies the nodes (that is, the communication apparatuses 100A to 100F and the management server 200) constituting the mesh network into two groups of 'goal group' and 'non-goal group'. In the exemplary embodiment, the management server 200 as an example of a specific communication apparatus is used. Further, the goal group is used as an example of the group.

The goal group is a set of the nodes including the management server 200 which is the receiving destination. In additional description, the goal group may be determined as the set of nodes of which the transmitting destination on the mesh network using the management server 200 as the receiving destination is determined. Meanwhile, the non-goal group is the set of nodes not included in the goal group. In additional description, the non-goal group may be determined as the set of nodes of which the transmitting destination on the mesh network using the management server 200 as the receiving destination is not yet determined.

At a processing start time by the management server 200, only the management server 200 which is the receiving destination is included in the goal group and the residual nodes (that is, the communication apparatuses 100A to 100F) are included in the non-goal group. In addition, by a processing to be described below, the nodes included in the non-goal group are sequentially moved to the goal group. The processing is repeatedly performed until the non-goal group is empty to determine the transmitting destination and the transmitting source of each node on the mesh network.

Figure 15:
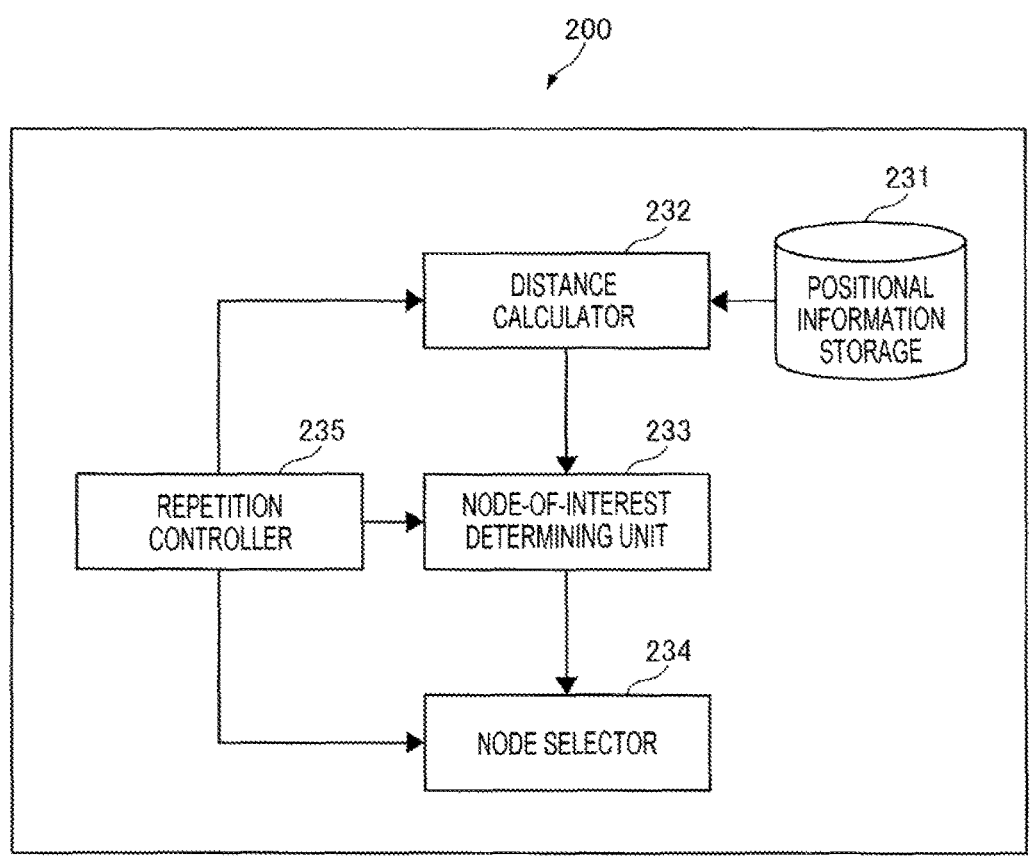
FIG. 15 is a block diagram illustrating a functional configuration example of a management server according to a third exemplary embodiment.

FIG. 15 is a block diagram illustrating the functional configuration example of the management server 200 according to the third exemplary embodiment. The management server 200 according to the exemplary embodiment includes a positional information storage 231, a distance calculator 232, a node-of-interest determining unit 233, a node selector 234, and a repetition controller 235.

The positional information storage 231 stores information (positional information) of a position at which each node is installed. As the positional information, for example, coordinates of a latitude and a longitude may be exemplified.

The distance calculator 232 calculates the distance between the node included in the goal group and the node included in the non-goal group based on the positional information of each node included in the positional information storage 231. Herein, the distance calculator 232 calculates the distance between each of the nodes included in the goal group and each of the nodes (that is, the respective nodes not included in the goal group) included in the non-goal group.

A case is also considered where it is difficult for the radio wave to reach the destination due to the obstacle such as a building or wall according to the position at which the node is installed. Therefore, the distance calculator 232 may calculate the distance by considering an influence of the obstacle. Specifically, for example, in the case where it is difficult for the radio wave to reach the destination due to the building which exists between the nodes, a value which is twice larger than the distance between the nodes is used as the distance.

The node-of-interest determining unit 233 as an example of an extracting unit determines a node of interest from the non-goal group based on information of the distance calculated by the distance calculator 232. Herein, the node-of-interest determining unit 233 first selects one of the nodes included in the non-goal group. Subsequently, a value of a 'second shortest distance' among the distances up to the respective nodes included in the goal group from the selected node is acquired. The node-of-interest determining unit 233 performs a processing of acquiring the value of the 'second shortest distance' with respect to each node included in the non-goal group. In addition, the node-of-interest determining unit 233 determines, as a node of interest, a node of which the value of the 'second shortest distance' is smallest among the nodes included in the non-goal group.

The node selector 234 as an example of a selector selects, from among the nodes included in the goal group, a node having a distance from the node of interest that meets a predetermined condition. More specifically, the node selector 234 selects two nodes in ascending order from a node which is closest to the node of interest (whose distance from the node of interest is the shortest), from among the nodes included in the goal group. In addition, the node selector 234 sets the selected node as the node of the transmitting destination to which the node of interest transmits data by the wireless communication on the mesh network. Subsequently, the node selector 234 includes the node of interest in not the non-goal group but the goal group.

The repetition controller 235 determines whether the non-goal group is empty after the node selector 234 includes the node of interest in the goal group. When the non-goal group is empty, a series of processing ends. Meanwhile, when the node is still included in the non-goal group, the repetition controller 235 subsequently executes the processing with respect to the distance calculator 232, the node-of-interest determining unit 233, and the node selector 234.

The software and hardware resources cooperate with each other to implement each functional unit constituting the management server 200 illustrated in FIG. 15. Specifically, when the management server 200 is implemented by the hardware configuration illustrated in FIG. 2, for example, the program of the OS or the application program stored in the magnetic disk device 203 is read by the main memory 202 and executed by the CPU 201, and as a result, the respective functions of the distance calculator 232, the node-of-interest determining unit 233, the node selector 234, the repetition controller 235, etc., are implemented. Further, the positional information storage 231 is implemented by the storage unit such as the magnetic disk device 203.

Specific Example of Processing of Determining Transmitting Destination and Transmitting Source of Each Node Subsequently, a processing in which the management server 200 according to the exemplary embodiment determines the transmitting destination and the transmitting source of each node is described by using the specific example. FIGS. 16A to 16G are diagrams for describing the specific example of the processing in which the management server 200 determines the transmitting destination and the transmitting source of each node according to the third exemplary embodiment.

First, at the processing start time by the management server 200, only the management server 200 is included in the goal group and the communication apparatuses 100A to 100F are included in the non-goal group. Herein, the distance calculator 232 calculates the distance between the management server 200 included in the goal group and each of the communication apparatuses 100A to 100F included in the non-goal group based on the positional information of each node included in the positional information storage 231. In the example illustrated in FIG. 16A, the distances between the management server 200 and the communication apparatuses 100A to 100F are set as d1(A) to d1(F), respectively.

Subsequently, the node-of-interest determining unit 233 performs the processing of acquiring the value of the 'second shortest distance' with respect to each node included in the non-goal group. At this time, only one node (that is, the management server 200) exists in the goal group. As a result, the node-of-interest determining unit 233 performs the processing of acquiring the value of a 'first shortest distance' with respect to each node included in the non-goal group. The 'first shortest distances' of the respective nodes are d1(A) to d1(F). Subsequently, the node-of-interest determining unit 233 determines the nodes in which the values of d1(A) to d1(F) are smallest as the node of interest. In the example illustrated in FIG. 16A, the communication apparatus 100A is determined as the node of interest.

Figure 16A:
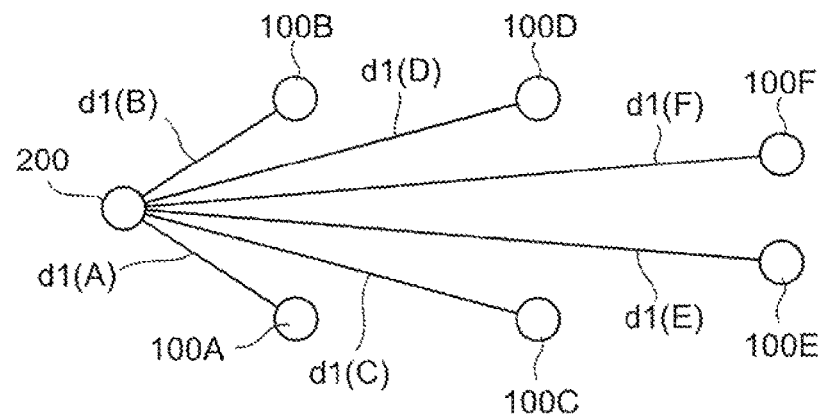
FIGS. 16A to 16D are diagrams for describing the specific example of a processing in which the management server determines a transmitting destination and a transmitting source of each node according to the third exemplary embodiment.
Figure 16B:
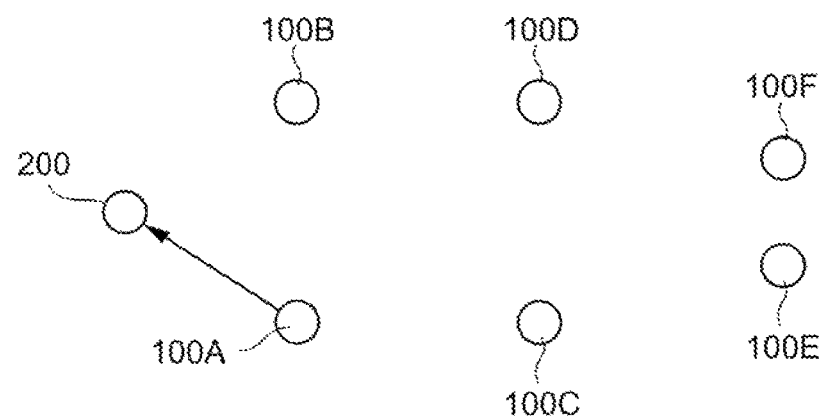
Figure 16C:
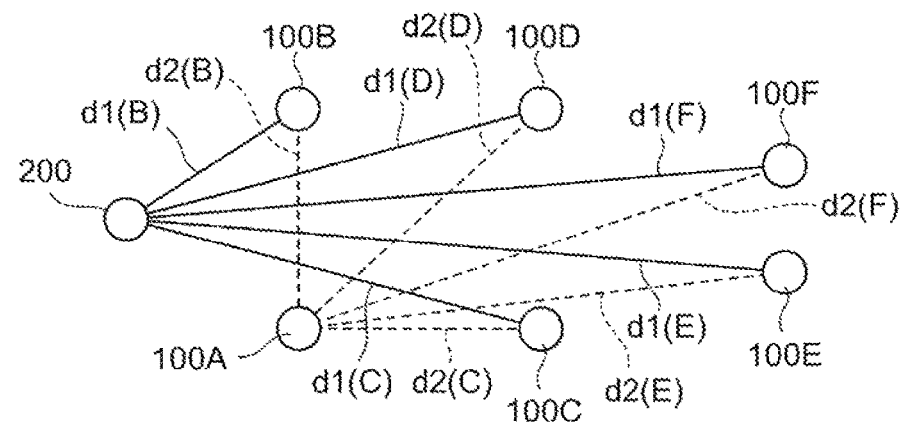

Subsequently, the node selector 234 selects two nodes in ascending order from a node which is closest to the communication apparatus 100A, from among the nodes included in the goal group. Only one node (the management server 200) exists in the goal group. As a result, the node selector 234 selects the management server 200 to set the selected management server 200 as the node of the transmitting destination that transmits data from the communication apparatus 100A as illustrated in FIG. 16B. Subsequently, the node selector 234 includes the communication apparatus 100A which is the node of interest in not the non-goal group but the goal group.

Subsequently, the distance calculator 232 calculates the distance between each of the management server 200 and the communication apparatus 100A included in the goal group and each of the communication apparatuses 100B to 100F included in the non-goal group. In the example illustrated in FIG. 16C, the distances between the communication apparatus 100A and the communication apparatuses 100B to 100F are set as d2(B) to d2(F), respectively. Further, since calculating the distances d1(B) to d1(F) between the management server 200 and the communication apparatuses 100B to 100F is completed, the distances may not be newly calculated.

Subsequently, the node-of-interest determining unit 233 performs the processing of acquiring the value of the 'second shortest distance' with respect to each node included in the non-goal group. For example, in the case of the communication apparatus 100B, d1(B) is shorter than d2(B). As a result, the 'second shortest distance' of the communication apparatus 100B is d2(B). Further, for example, in the case of the communication apparatus 100C, d2(C) is shorter than d1(C). As a result, the 'second shortest distance' of the communication apparatus 100C is d1(C). Similarly, the node-of-interest determining unit 233 acquires d1(D), d1(E), and d1(F) as the 'second shortest distances' of the communication apparatuses 100d to 100F, respectively.

The node-of-interest determining unit 233 determines, as a node of interest, the node of which the value of the 'second shortest distance' is smallest, which is acquired with respect to each node included in the non-goal group. In the example illustrated in FIG. 16C, the smallest value among d2(B), d1(C), d1(D), d1(E), and d1(F) is d2(B). As a result, the communication apparatus 100B is determined as the node of interest.

Figure 16D:
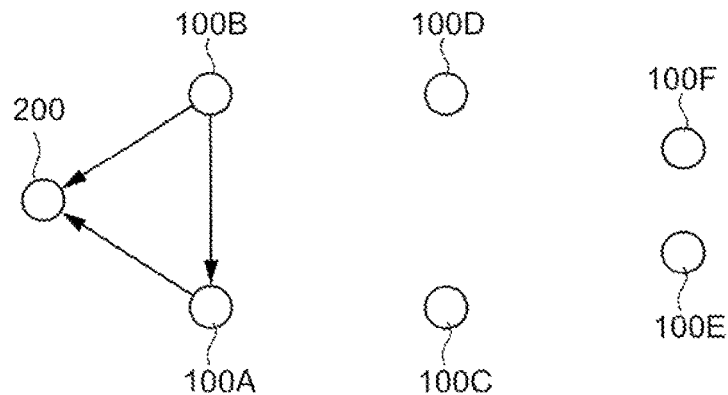
Figure 16E:
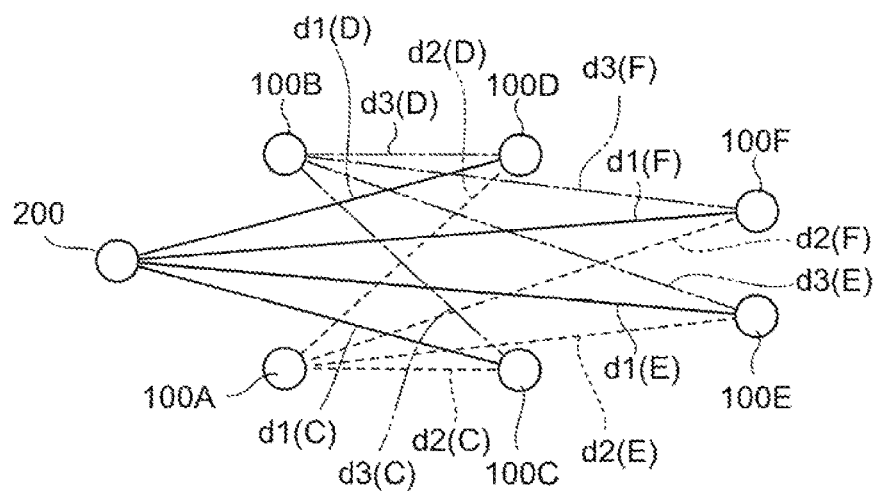
FIGS. 16E to 16G are diagrams for describing the specific example of the processing in which the management server determines the transmitting destination and the transmitting source of each node according to the third exemplary embodiment.

Subsequently, the node selector 234 selects two nodes in ascending order from a node which is the closest to the communication apparatus 100B, from among the nodes included in the goal group. Only two nodes (the management server 200 and the communication apparatus 100A) exist in the goal group. As a result, the node selector 234 selects the management server 200 and the communication apparatus 100A to set the selected management server 200 and communication apparatus 100A as the node of the transmitting destination that transmits the data from the communication apparatus 100B as illustrated in FIG. 16D. Subsequently, the node selector 234 includes the communication apparatus 100B which is the node of interest in not the non-goal group but the goal group.

Subsequently, the distance calculator 232 calculates the distance between each of the management server 200, the communication apparatus 100A, and the communication apparatus 100B included in the goal group and each of the communication apparatuses 100C to 100F included in the non-goal group. In the example illustrated in FIG. 16E, the distances between the communication apparatus 100B and the communication apparatuses 100C to 100F are set as d3(C) to d3(F), respectively. Further, since calculating the distances d1(C) to d1(F) between the management server 200 and the communication apparatuses 100C to 100F and the distances d2(C) to d2(F) between the communication apparatus 100A and the communication apparatuses 100C to 100F is completed, the distances may not be newly calculated.

Subsequently, the node-of-interest determining unit 233 performs the processing of acquiring the value of the 'second shortest distance' with respect to each node included in the non-goal group. For example, in the case of the communication apparatus 100C, among d1(C), d2(C), and d3(C), the first shortest distance is set to d2(C) and the second shortest distance is set to d3(C). As a result, the 'second shortest distance' of the communication apparatus 100C is d3(C). Further, for example, in the case of the communication apparatus 100D, among d1(D), d2(D), d3(D), the first shortest distance is set to d3(D) and the second shortest distance is set to d2(D). As a result, the 'second shortest distance' of the communication apparatus 100D is d2(D). Similarly, the node-of-interest determining unit 233 acquires d2(E) and d2(F) as the 'second shortest distances' of the communication apparatuses 100E and 100F, respectively.

The node-of-interest determining unit 233 determines, as a node of interest, the node of which the value of the 'second shortest distance' is smallest, which is acquired with respect to each node included in the non-goal group. In the example illustrated in FIG. 16E, the smallest value is d3(C) among d3(C), d2(D), d2(E), and d2(F). As a result, the communication apparatus 100C is determined as the node of interest.

Figure 16F:
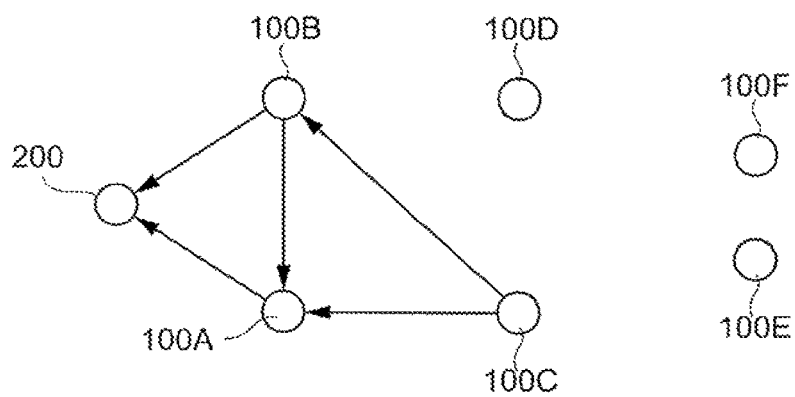

Subsequently, the node selector 234 selects two nodes which are closer to the communication apparatus 100C among the nodes included in the goal group. Herein, among the management server 200, the communication apparatus 100A, and the communication apparatus 100B included in the goal group, the communication apparatus 100A is closest to the communication apparatus 100C and the communication apparatus 100B is second closest to the communication apparatus 100C. As a result, the node selector 234 selects the communication apparatus 100A and the communication apparatus 100B to set the selected communication apparatuses 100A and 100B as the node of the transmitting destination that transmits the data from the communication apparatus 100C as illustrated in FIG. 16F. Subsequently, the node selector 234 includes the communication apparatus 100C which is the node of interest in not the non-goal group but the goal group.

Figure 16G:
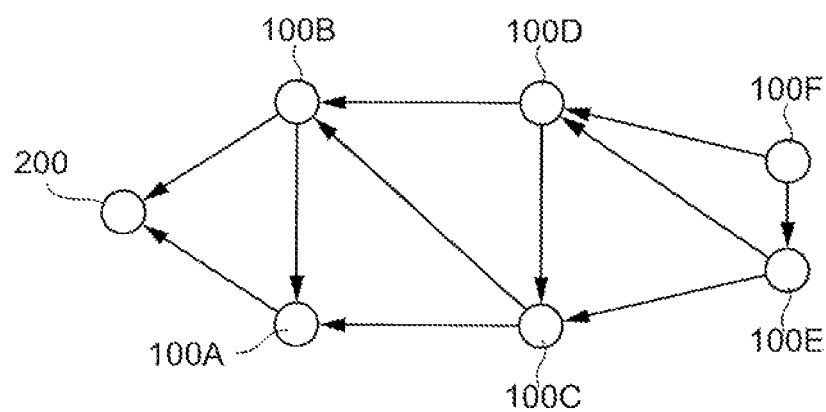

By such a configuration, the distance calculator 232, the node-of-interest determining unit 233, and the node selector 234 repeatedly execute the processing until the non-goal group is empty. In other words, the processing is repeatedly executed until all of the management server 200 and the communication apparatuses 100A to 100F become the nodes of the net-group and the transmitting destination and the transmitting source on the mesh network using the management server 200 as the receiving destination are determined with respect to each node. As a result, as illustrated in FIG. 16G, the communication paths among the respective nodes are determined. In addition, when the repetition controller 235 determines that the non-goal group is empty, a series of processing ends.

Processing Sequence of Management Server

Figure 17:
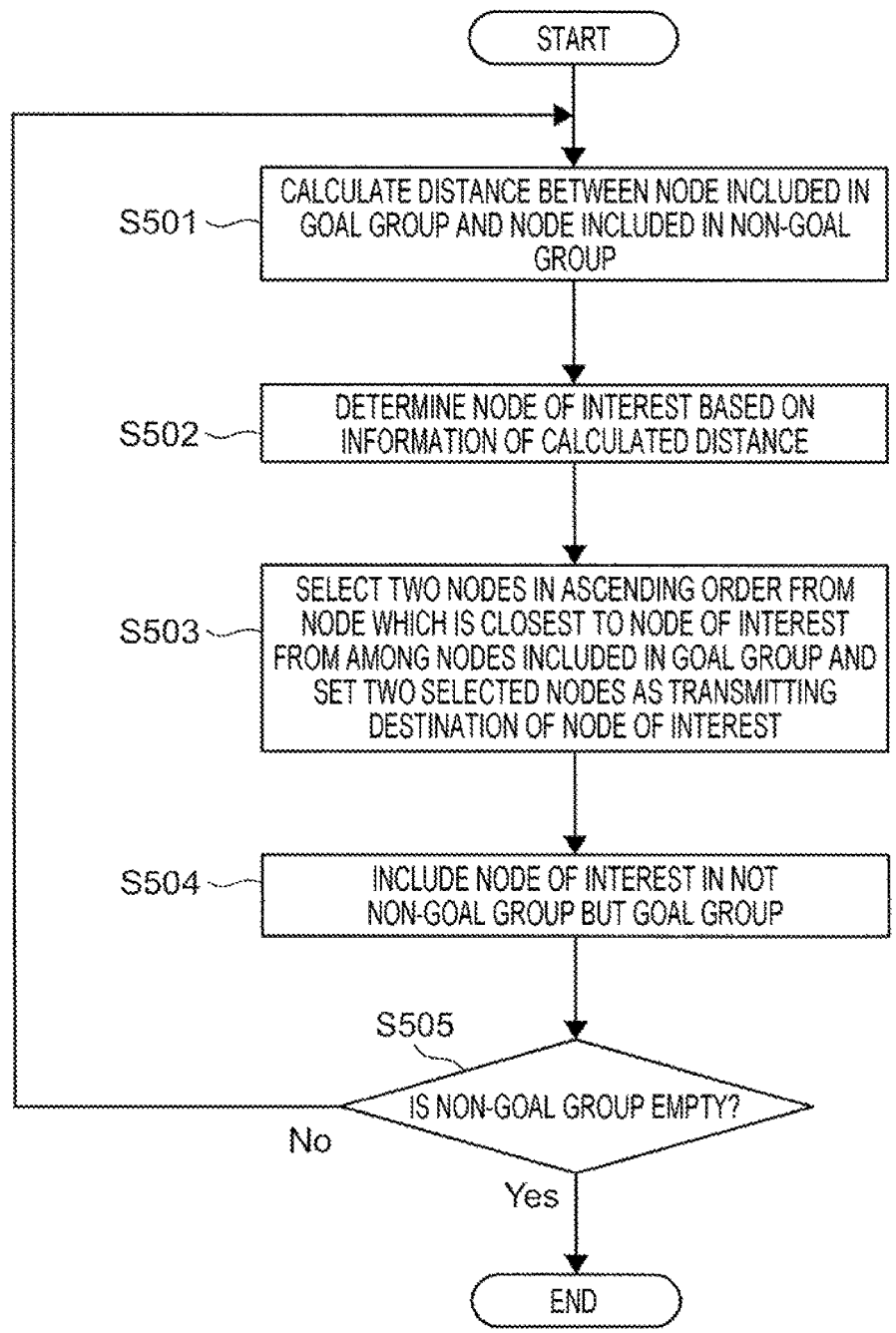
FIG. 17 is a flowchart illustrating an example of the processing sequence of the management server according to the third exemplary embodiment.

Subsequently, the processing sequence of the management server 200 according to the exemplary embodiment is described. FIG. 17 is a flowchart illustrating an example of the processing sequence of the management server 200 according to the third exemplary embodiment.

First, the distance calculator 232 calculates the distance between each of the nodes included in the goal group and each of the nodes included in the non-goal group based on the positional information of each node included in the positional information storage 231 (step 501). Subsequently, the node-of-interest determining unit 233 determines the node of interest based on information of the distance calculated by the distance calculator 232 (step 502). Herein, the node-of-interest determining unit 233 determines as the node of interest the node of which the value of the 'second shortest distance' is smallest among the nodes included in the non-goal group. Further, when the number of nodes included in the goal group is one (that is, the management server 200), the node-of-interest determining unit 233 determines as the node of interest the node of which the value of the 'first shortest distance' is smallest among the nodes included in the non-goal group.

Subsequently, the node selector 234 selects two nodes in ascending order from a node which is the closest to the node of interest, from among the nodes included in the goal group and set the two selected nodes as the transmitting destination of the node of interest (step 503). Further, when the number of nodes included in the goal group is one (that is, the management server 200), the node selector 234 selects the one node. Subsequently, the node selector 234 includes the node of interest in not the non-goal group but the goal group (step 504).

Subsequently, the repetition controller 235 determines whether the non-goal group is empty (step 505). When it is determined that the non-goal group is empty (Yes in step 505), the present processing flow ends. Meanwhile, when it is determined that the node is still included in the non-goal group (No in step 505), the process proceeds to step 501.

By the present processing flow, the transmitting destination and the transmitting source on the mesh network are determined with respect to each node. In addition, for example, the management server 200 performs setting instructions of the transmitting destination and the transmitting source with respect to each node by wired communication or the wireless communication such as the BLE after the present processing flow, to thereby set the transmitting destination and the transmitting source in each node. As a result, the mesh network is constructed.

Meanwhile, in step 503, the node selector 234 selects two nodes in ascending order from a node which is the closest to the node of interest, from among the nodes included in the goal group. The node selector 234 may further select a node other than the two selected nodes. In other words, the node selector 234 may select a node which meets a predetermined condition and which is other than two selected nodes, from among the nodes included in the goal group. For example, when a node is positioned within a predetermined distance from the node of interest other than two selected nodes among the nodes included in the goal group, the node selector 234 may select even the node. Further, for example, when another node is positioned within a predetermined distance from the node which is the second shortest from the node of interest among the nodes included in the goal group, the node selector 234 may select even another node.

In the exemplary embodiment, the node-of-interest determining unit 233 determines the node in which the value of the 'second shortest distance' is smallest as the node of interest and the node selector 234 selects two nodes which are closer to the node of interest and sets two selected nodes as the transmitting destination of the node of interest. It should be noted that the present invention is not limited to such a configuration. In the example, such a configuration is provided in order to provide the detour path by using two transmitting destinations of the node of interest. Alternatively, the node-of-interest determining unit 233 may determine as the node of interest a node in which a value of a 'third shortest distance' acquired with respect to each node included in the non-goal group is smallest. In this case, the node selector 234 selects three nodes which are closer to the node of interest from among the nodes included in the goal group and sets three selected nodes as the node of the transmitting destination of the node of interest.

In additional description, the node-of-interest determining unit 233 determines as the node of interest a node in which a value of an 'N-th (N is an integer of 2 or more) shortest distance' acquired with respect to each node included in the non-goal group is smallest. In this case, the node selector 234 selects N nodes in ascending order from a node which is the closest to the node of interest, from among the nodes included in the goal group and sets N selected nodes as the node of the transmitting destination of the node of interest. As the value of the N increases, the detour path increases, and as a result, a more robust mesh network is constructed. Further, in the exemplary embodiment, N nodes are used as an example of a predetermined number of communication apparatuses.

Fourth Exemplary Embodiment

Subsequently, a communication system 1 according to a fourth exemplary embodiment of the present invention is described. The communication system 1 according to the exemplary embodiment includes plural communication apparatuses 100A to 100F and the management server 200 similarly to FIG. 7. In addition, in the third exemplary embodiment, the management server 200 determines the transmitting destination and the transmitting source of each node based on the distance of each node. Meanwhile, in the fourth exemplary embodiment, the management server 200 determines the transmitting destination and the transmitting source of each node based on the radio wave strength of the radio wave actually received by each node.

In more description, for example, the processing by the third exemplary embodiment is performed, and as a result, the mesh network using the management server 200 as the receiving destination is constructed. However, when the radio wave is actually transmitted/received between the nodes, for example, considered is the case where the radio wave is not normally transmitted/received between the nodes and a time for transmitting/receiving data is required by, for example, the influence by the obstacle, etc. Therefore, in the exemplary embodiment, after the mesh network is constructed, the transmitting destination and the transmitting source of each node are determined again based on the radio wave strength of the radio wave actually received by each node.

The mesh network according to the exemplary embodiment is a mesh network having the detour path provided between the communication apparatuses 100 and configured to transmit various data to the management server 200 which is the receiving destination, similarly to the third exemplary embodiment. In addition, six communication apparatuses 100 are illustrated in FIG. 7. It should be noted that the number of communication apparatuses 100 is not limited to six as illustrated. Moreover, the hardware configuration example of the communication apparatus 100 and the management server 200 according to the exemplary embodiment is similar to the hardware configuration example of FIG. 2.

Functional Configuration of Management Server

Figure 18:
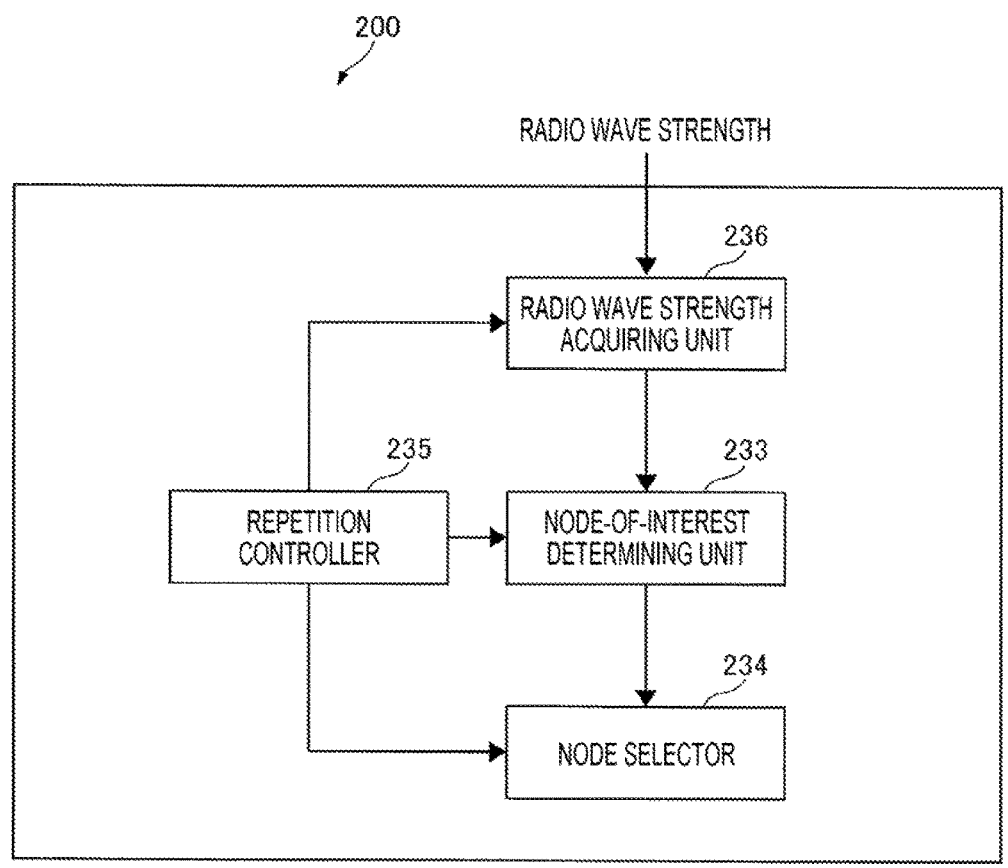
FIG. 18 is a block diagram illustrating a functional configuration example of a management server according to a fourth exemplary embodiment.

Subsequently, the functional configuration of the management server 200 according to the fourth exemplary embodiment is described. FIG. 18 is a block diagram illustrating the functional configuration example of the management server 200 according to the fourth exemplary embodiment. The management server 200 according to the exemplary embodiment is different from the functional configuration example of FIG. 15 according to the third exemplary embodiment in that the management server 200 includes a radio wave strength acquiring unit 236 without the positional information storage 231 and the distance calculator 232.

The radio wave strength acquiring unit 236 acquires the strength of the radio wave transmitted to each node included in a goal group from each node included in a non-goal group. More specifically, each node included in the goal group measures the strength of the radio wave transmitted from each node included in the non-goal group. In addition, the radio wave strength acquiring unit 236 acquires the measured strength of the radio wave from each node included in the goal group. In this case, the acquiring of the radio wave strength is performed by the constructed mesh network, BLE, or the like.

The node-of-interest determining unit 233 as an example of an extracting unit determines a node of interest from the non-goal group based on information of the radio wave strength acquired by the radio wave strength acquiring unit 236. Herein, the node-of-interest determining unit 233 first selects one of the nodes included in the non-goal group. Subsequently, a value of a 'second highest radio wave strength' among the strengths of the radio waves transmitted to the respective nodes included in the goal group from the selected node is acquired. The node-of-interest determining unit 233 performs a processing of acquiring the value of the 'second highest radio wave strength' with respect to each node included in the non-goal group. In addition, the node-of-interest determining unit 233 determines as, a node of interest, a node of which the value of the 'second highest radio wave strength' is largest among the nodes included in the non-goal group.

The node selector 234 as an example of a selector selects, from among the nodes included in the goal group, a node in which the strength of the radio wave transmitted from the node of interest meets a predetermined condition. More specifically, the node selector 234 selects two nodes in descending order from a node having the highest strength of the radio wave transmitted from the node of interest, from among the nodes included in the goal group. In addition, the node selector 234 sets the selected node as the node of the transmitting destination to which the node of interest transmits data by the wireless communication on the mesh network. Subsequently, the node selector 234 includes the node of interest in not the non-goal group but the goal group.

The repetition controller 235 determines whether the non-goal group is empty after the node selector 234 includes the node of interest in the goal group. When the non-goal group is empty, a series of processing ends. Meanwhile, when the node is still included in the non-goal group, the repetition controller 235 subsequently executes the processing with respect to the radio wave strength acquiring unit 236, the node-of-interest determining unit 233, and the node selector 234.

The software and hardware resources cooperate with each other to implement each functional unit constituting the management server 200 illustrated in FIG. 18. Specifically, when the management server 200 is implemented by the hardware configuration illustrated in FIG. 2, for example, the program of the OS or the application program stored in the magnetic disk device 203 is read by the main memory 202 and executed by the CPU 201, and as a result, the respective functions of the radio wave strength acquiring unit 236, the node-of-interest determining unit 233, the node selector 234, the repetition controller 235, etc., are implemented.

Specific Example of Processing of Determining Transmitting Destination and Transmitting Source of Each Node Subsequently, a processing in which the management server 200 according to the exemplary embodiment determines the transmitting destination and the transmitting source of each node is described by using the specific example. FIGS. 19A to 19G are diagrams for describing the specific example of the processing in which the management server 200 according to the fourth exemplary embodiment determines the transmitting destination and the transmitting source of each node.

First, at the processing start time by the management server 200, only the management server 200 is included in the goal group and the communication apparatuses 100A to 100F are included in the non-goal group. Herein, the radio wave strength acquiring unit 236 acquires the strength of the radio wave transmitted to the management server 200 included in the goal group from the communication apparatuses 100A to 100F included in the non-goal group. In the example illustrated in FIG. 19A, the strengths of the radio waves transmitted to the management server 200 from the communication apparatuses 100A to 100F are set as e1(A) to e1(F), respectively.

Subsequently, the node-of-interest determining unit 233 performs the processing of acquiring the value of the 'second highest strength of the radio wave' with respect to each node included in the non-goal group. At this time, only one node (that is, the management server 200) exists in the goal group. As a result, the node-of-interest determining unit 233 performs the processing of acquiring the value of a 'first highest strength of the radio wave' with respect to each node included in the non-goal group. The 'first highest strengths of the radio wave' of the respective nodes are e1(A) to e1(F). Subsequently, the node-of-interest determining unit 233 determines the nodes in which the values of e1(A) to e1(F) are largest as the node of interest. In the example illustrated in FIG. 19A, the communication apparatus 100A is determined as the node of interest.

Figure 19A:
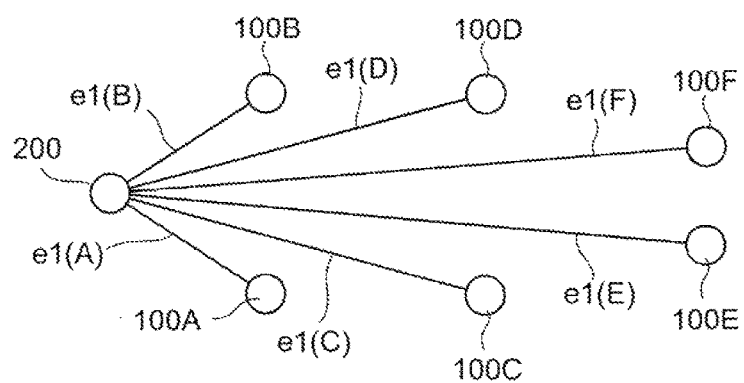
FIGS. 19A to 19D are diagrams for describing the specific example of a processing in which the management server determines a transmitting destination and a transmitting source of each node according to the fourth exemplary embodiment.
Figure 19B:
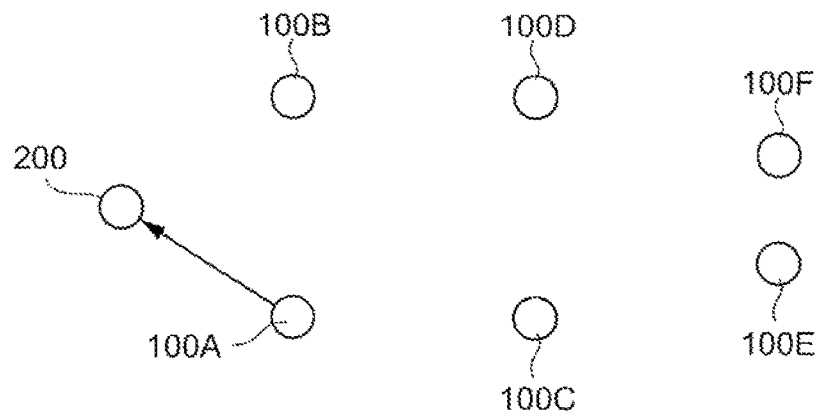
Figure 19C:
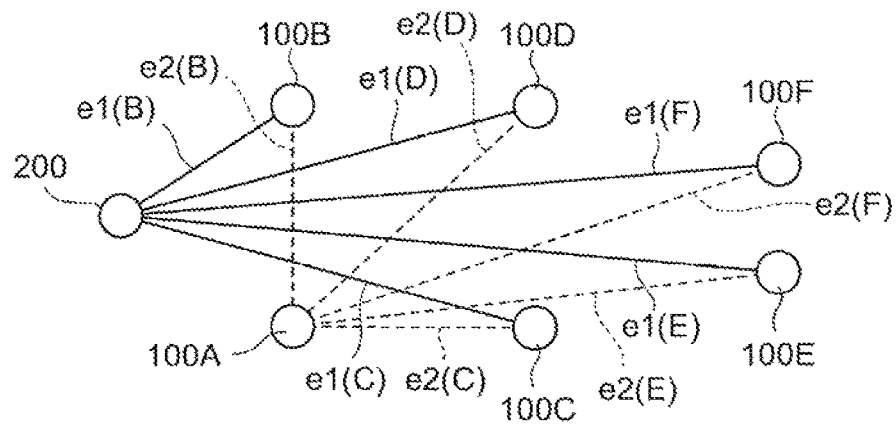

Subsequently, the node selector 234 selects two nodes in descending order from a node having the highest strength of the radio wave transmitted from the communication apparatus 100A, from among the nodes included in the goal group. Only one node (the management server 200) exists in the goal group. As a result, the node selector 234 selects the management server 200 to set the selected management server 200 as the node of the transmitting destination that transmits data from the communication apparatus 100A as illustrated in FIG. 19B. Subsequently, the node selector 234 includes the communication apparatus 100A which is the node of interest in not the non-goal group but the goal group.

Subsequently, the radio wave strength acquiring unit 236 acquires the strength of the radio wave transmitted to each of the management server 200 and the communication apparatus 100A included in the goal group from each of the communication apparatuses 100B to 100F included in the non-goal group. In the example illustrated in FIG. 19C, the strengths of the radio waves transmitted to the communication apparatus 100A from the communication apparatuses 100B to 100F are set as e2(B) to e2(F), respectively. Further, since the acquiring of the strengths e1(B) to e1(F) of radio waves transmitted to the management server 200 from the communication apparatuses 100B to 100F is completed, the strengths need not be newly acquired.

Subsequently, the node-of-interest determining unit 233 performs the processing of acquiring the value of the 'second highest strength of the radio wave' with respect to each node included in the non-goal group. For example, in the case of the communication apparatus 100B, e1(B) is higher than e2(B). As a result, the 'second highest strength of the radio wave' of the communication apparatus 100B is e2(B). Further, for example, in the case of the communication apparatus 100C, e2(C) is higher than e1(C). As a result, the 'second highest strength of the radio wave' of the communication apparatus 100C is e1(C). Similarly, the node-of-interest determining unit 233 acquires e1(D), e1(E), and e1(F) as the 'second highest strength of the radio wave' of the communication apparatuses 100D to 100F, respectively.

The node-of-interest determining unit 233 determines, as a node of interest, a node of which the value of the 'second highest strength of the radio wave' is largest, which is acquired with respect to each node included in the non-goal group. In the example illustrated in FIG. 19B, the largest value among e2(B), e1(C), e1(D), e1(E), and e1(F) is e2(B). As a result, the communication apparatus 100B is determined as the node of interest.

Figure 19D:
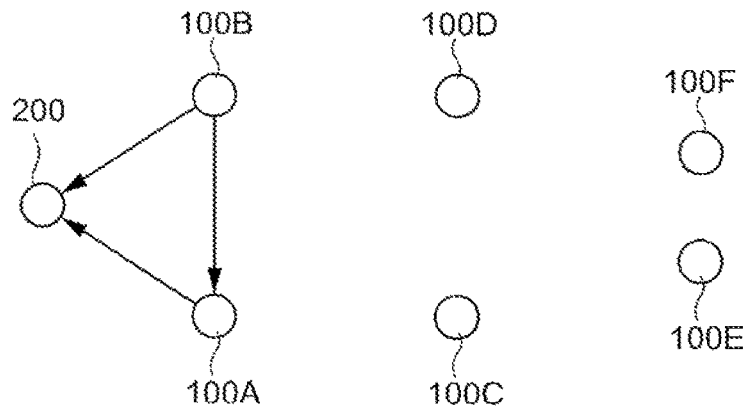
Figure 19E:
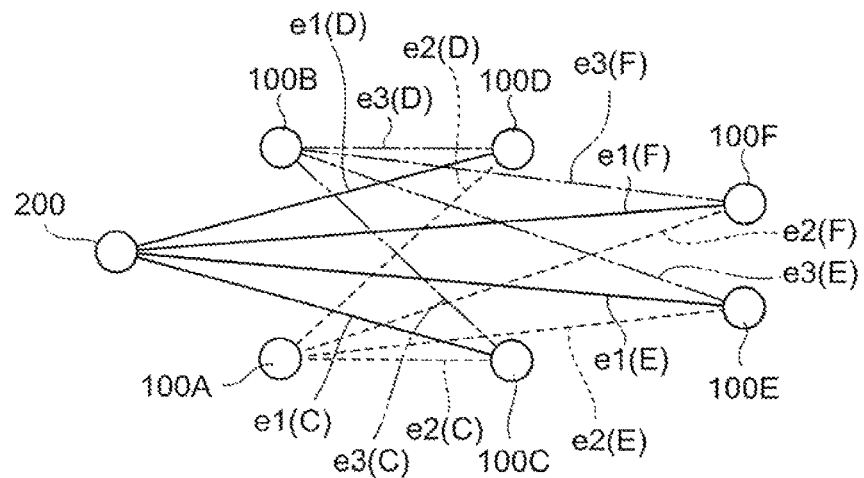
FIGS. 19E to 19G are diagrams for describing the specific example of the processing in which the management server determines the transmitting destination and the transmitting source of each node according to the fourth exemplary embodiment.

Subsequently, the node selector 234 selects two nodes in descending order from a node having the highest strength of the radio wave transmitted from the communication apparatus 100A, from among the nodes included in the goal group. Only two nodes (the management server 200 and the communication apparatus 100A) exist in the goal group. As a result, the node selector 234 selects the management server 200 and the communication apparatus 100A to set the selected management server 200 and communication apparatus 100A as the node of the transmitting destination that transmits the data from the communication apparatus 100B as illustrated in FIG. 19D. Subsequently, the node selector 234 includes the communication apparatus 100B which is the node of interest in not the non-goal group but the goal group.

Subsequently, the radio wave strength acquiring unit 236 acquires the strength of the radio wave transmitted to each of the management server 200, the communication apparatus 100A, and the communication apparatus 100B included in the goal group from each of the communication apparatuses 100C to 100F included in the non-goal group. In the example illustrated in FIGS. 19E to 19G, the strengths of the radio waves transmitted to the communication apparatus 100B from the communication apparatuses 100C to 100F are set as e3(C) to e3(F), respectively. Further, since the acquiring of the strengths e1(C) to e1(F) of the radio waves transmitted to the management server 200 from the communication apparatuses 100C to 100F and the strengths e2(C) to e2(F) of the radio waves transmitted to the communication apparatus 100A from the communication apparatuses 100C to 100F is completed, the strengths need not be newly acquired.

Subsequently, the node-of-interest determining unit 233 performs the processing of acquiring the value of the 'second highest strength of the radio wave' with respect to each node included in the non-goal group. For example, in the case of the communication apparatus 100C, among e1(C), e2(C), and e3(C), the first highest strength is set to e2(C) and the second highest strength is set to e3(C). As a result, the 'second highest strength of the radio wave' of the communication apparatus 100C is e3(C). Further, for example, in the case of the communication apparatus 100D, among e1(D), e2(D), e3(D), the first highest strength is set to e3(D)

and the second highest strength is set to e2(D). As a result, the 'second highest strength of the radio wave' of the communication apparatus 100D is e2(D). Similarly, the node-of-interest determining unit 233 acquires e2(E) and e3(F) as the 'second highest strengths of the radio waves' of the communication apparatuses 100E and 100F, respectively.

The node-of-interest determining unit 233 determines, as a node of interest, a node of which the value of the 'second highest strength of the radio wave' is largest, which is acquired with respect to each node included in the non-goal group. In the example illustrated in FIG. 19E, the highest value is e2(D) among e3(C), e2(D), e2(E), and e3(F). As a result, the communication apparatus 100D is determined as the node of interest.

Figure 19F:
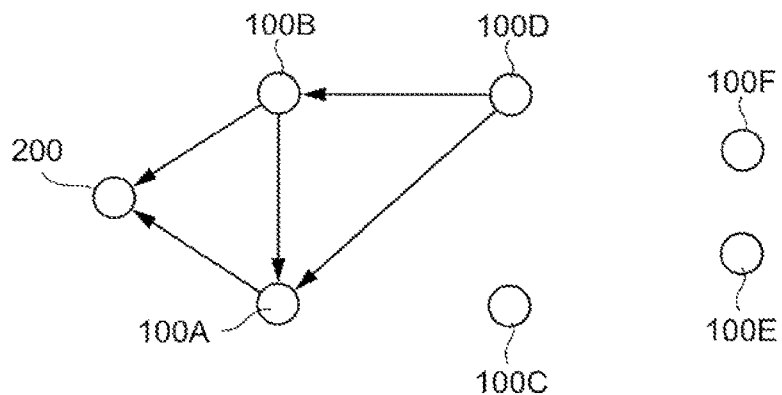

Subsequently, the node selector 234 selects two nodes in descending order from a node having the highest strength of the radio wave transmitted from the communication apparatus 100D, from among the nodes included in the goal group. Herein, among the management server 200, the communication apparatus 100A, and the communication apparatus 100B included in the goal group, the communication apparatus 100B has the highest strength of the radio wave transmitted from the communication apparatus 100D and the communication apparatus 100A has the second highest strength of the radio wave transmitted from communication apparatus 100D. As a result, the node selector 234 selects the communication apparatus 100B and the communication apparatus 100A to set the selected communication apparatuses 100B and 100A as the nodes of the transmitting destination that transmits the data from the communication apparatus 100D as illustrated in FIG. 19F. Subsequently, the node selector 234 includes the communication apparatus 100D which is the node of interest in not the non-goal group but the goal group.

Figure 19G:
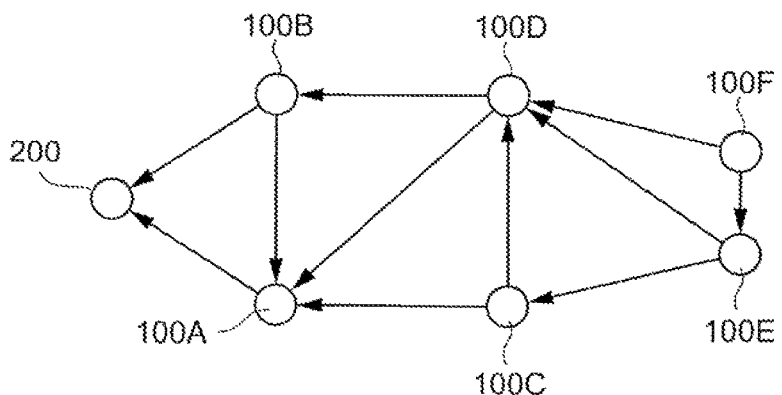

By such a configuration, the radio wave strength acquiring unit 236, the node-of-interest determining unit 233, and the node selector 234 repeatedly execute the processing until the non-goal group is empty. In other words, the processing is repeatedly executed until all of the management server 200 and the communication apparatuses 100A to 100F become the nodes of the net-group and the transmitting destination and the transmitting source on the mesh network using the management server 200 as the receiving destination are determined with respect to each node. As a result, as illustrated in FIG. 19G, the communication paths among the respective nodes are determined. In addition, when the repetition controller 235 determines that the non-goal group is empty, a series of processing ends.

In additional description, in the examples illustrated in FIGS. 16A to 16G, the communication apparatus 100A, the communication apparatus 100B, and the communication apparatus 100C are sequentially set as the node of interest and finally, the mesh network illustrated in FIG. 16G is constructed. Meanwhile, in the examples illustrated in FIGS. 19A to 19G, the communication apparatus 100A, the communication apparatus 100B, and the communication apparatus 100D are sequentially set as the node of interest and finally, the mesh network illustrated in FIG. 19G is reconstructed. That is, based on the strength of the actually transmitted and received radio wave, the setting the transmitting destination and the transmitting source of the node and the path between the nodes are changed.

Processing Sequence of Management Server

Figure 20:
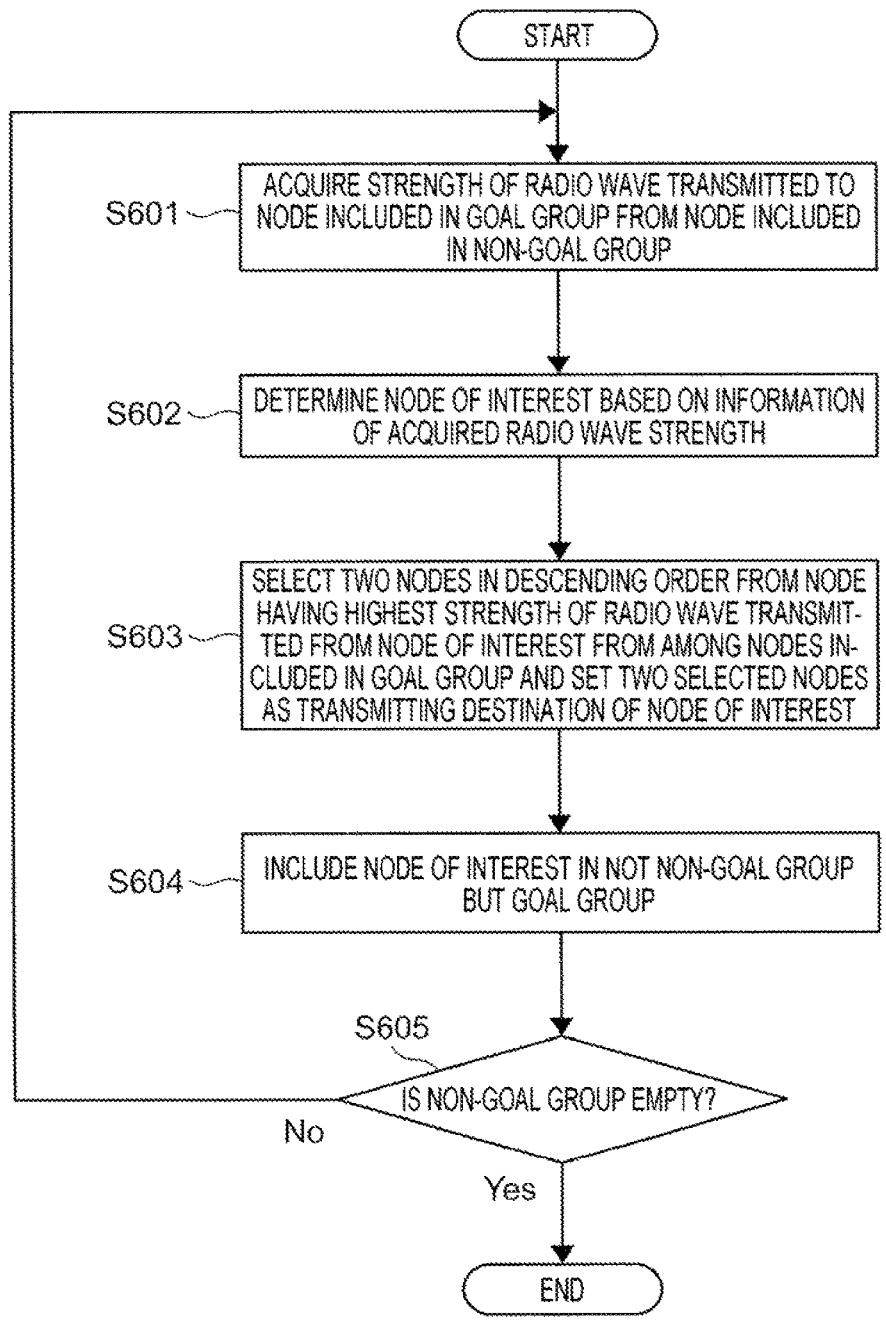
FIG. 20 is a flowchart illustrating an example of a processing sequence of the management server according to the fourth exemplary embodiment.

Subsequently, the processing sequence of the management server 200 according to the exemplary embodiment is described. FIG. 20 is a flowchart illustrating an example of the processing sequence of the management server 200 according to the fourth exemplary embodiment.

First, the radio wave strength acquiring unit 236 acquires the strength of the radio wave transmitted to each node included in a goal group from each node included in a non-goal group (step 601). Subsequently, the node-of-interest determining unit 233 determines a node of interest based on information of the radio wave strength acquired by the radio wave strength acquiring unit 236 (step 602). Herein, the node-of-interest determining unit 233 determines, as a node of interest, a node of which the value of the 'second highest radio wave strength' is largest among the nodes included in the non-goal group. Alternatively, in the case where the number of nodes included in the goal group is one (that is, the management server 200), the node-of-interest determining unit 233 determines, as a node of interest, a node of which the value of the 'first highest radio wave strength' is largest among the nodes included in the non-goal group.

Subsequently, the node selector 234 selects two nodes in descending order from a node having the highest strength of the radio wave transmitted from the node of interest, from among the nodes included in the goal group and sets the two selected nodes as the transmitting destination of the node of interest (step 603). Further, when the number of nodes included in the goal group is one (that is, the management server 200), the node selector 234 selects the one node. Subsequently, the node selector 234 includes the node of interest in not the non-goal group but the goal group (step 604).

Subsequently, the repetition controller 235 determines whether the non-goal group is empty (step 605). When it is determined that the non-goal group is empty (Yes in step 605), the processing flow ends. Meanwhile, when it is determined that the node is still included in the non-goal group (No in step 605), the process proceeds to step 601.

By the present processing flow, the transmitting destination and the transmitting source on the mesh network are determined with respect to each node. In addition, for example, the management server 200 performs setting instructions of the transmitting destination and the transmitting source with respect to each node by wired communication or wireless communication such as BLE after the present processing flow, to thereby set the transmitting destination and the transmitting source in each node. And as a result, the mesh network is reconstructed. Alternatively, the management server 200 may perform setting instructions of the transmitting destination and the transmitting source with respect to the node of interest and the node of the transmitting destination thereof whenever the node of interest and the node of the transmitting destination thereof are determined, to establish the connection of wireless communication.

In step 603, the node selector 234 selects two nodes in descending order from a node having the highest strength of the radio wave transmitted from the node of interest, from among the nodes included in the goal group. The node selector 234 may further select anode other than the two selected nodes. In other words, the node selector 234 may select a node which meets a predetermined condition and which is other than two selected nodes, from among the nodes included in the goal group. For example, when there is a node having a radio wave strength equal to or higher than a predetermined strength of the radio wave transmitted from the node of interest other than the two selected nodes among the nodes included in the goal group, the node selector 234 may select the node. Further, for example, if there is the other node in which a difference between the radio wave strengths is within the predetermined range, as compared with the node having the second highest strength of the radio wave transmitted from the node of interest, among the nodes included in the goal group, the node selector 234 may select the other node.

In the exemplary embodiment, the node-of-interest determining unit 233 determines as the node of interest the node of which the value of the 'second highest strength of the radio wave' is largest, and the node selector 234 selects two nodes having the highest strength of the radio wave transmitted from the node of interest to set the two nodes as the transmitting destination of the node of interest. It should be noted that the invention is not limited to the configuration. In the aforementioned example, although the above-described configuration is set in order to provide a detour path by setting two transmitting destinations of the node of interest, for example, the node-of-interest determining unit 233 may determine as the node of interest the node of which the value of the 'third highest strength of the radio wave' acquired with respect to each node included in the non-goal group is largest. In this case, the node selector 234 selects three nodes in descending order from a node having the highest strength of the radio wave transmitted from the node of interest, from among the nodes included in the goal group to set the three selected nodes as the node of the transmitting destination of the node of interest.

In addition, the node-of-interest determining unit 233 determines, as a node of interest, a node of which the value of the 'N-th (N is an integer of 2 or more) highest strength of the radio wave', which is acquired with respect to each node included in the non-goal group is largest. In this case, the node selector 234 selects N nodes in descending order from a node having the highest strength of the radio wave transmitted from the node of interest, from among the nodes included in the goal group to set the N selected nodes as the node of the transmitting destination of the node of interest. As the value of the N increases, the detour path increases, and as a result, a more robust mesh network is constructed. Further, in the exemplary embodiment, N nodes are used as an example of a predetermined number of communication apparatuses.

In the third exemplary embodiment and the fourth exemplary embodiment, the receiving destination of the mesh network is set as the management server 200. It should be noted that the invention is not limited to the configuration. The receiving destination of the mesh network is a node within the mesh network or a node which is a transmitting destination receiving the data from the external network, and an apparatus other than the management server 200 may be a receiving destination of the mesh network.

In the third exemplary embodiment and the fourth exemplary embodiment, the management server 200 performs the processing of determining the transmitting destination and the transmitting source of each node. Alternatively, apparatuses other than the management server 200 may perform the process. That is, the functions of the positional information storage 231, the distance calculator 232, the node-of-interest determining unit 233, the node selector 234, the repetition controller 235, and the radio wave strength acquiring unit 236 may be implemented by other apparatuses other than the management server 200.

The program implementing the exemplary embodiment of the present invention may be provided by the communication unit and provided while being stored in recording media including a CD-ROM, etc.

Meanwhile, various exemplary embodiments and modified examples are described as the first to fourth exemplary embodiments. It should be noted that any of the first to fourth exemplary embodiments and the modified examples may be combined arbitrarily. That is, for example, the communication system 1 may be configured by combining all of the first to fourth exemplary embodiments or the communication system 1 may be configured by combining any three exemplary embodiments or any two exemplary embodiments of the first to fourth exemplary embodiments.

It should be noted that the present invention is not limited to the exemplary embodiments. The invention may be implemented in various forms without departing from the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
a setting unit that sets a plurality of candidate points which are candidates of positions of a transmitter based on a position of one of a plurality of receivers that receive radio waves from the transmitter; and
a specifying unit that specifies a position of the transmitter from among the plurality of candidate points by using (i) strengths of the radio waves received by the one receiver and one or more other receivers of the plurality of receivers that receive radio waves from the transmitter and (ii) strengths of the radio waves which are inferred to be received by the one receiver and the one or more other receivers from the transmitter when it is assumed that the transmitter exists at each of the plurality of candidate points, wherein the specifying unit calculates, for each of the plurality of candidate points, a similarity between the strengths of the radio waves which the one or more receivers receive from the transmitter and the strengths of the radio waves which are inferred to be received by the one or more receivers from the transmitter when it is assumed that the transmitter exists at each candidate point.

2. The communication apparatus according to claim 1, wherein the setting unit sets the plurality of candidate points based on a distance between the one receiver and the transmitter, the distance being inferred from the strength of the radio wave received by the one receiver.

3. The communication apparatus according to claim 2, wherein the one receiver is a receiver of which the strength of the radio wave received from the transmitter is highest among the plurality of receivers.

4. The communication apparatus according to claim 1, wherein the specifying unit specifies a candidate point whose calculated similarity meets a predetermined condition, from among the plurality of candidate points as the position of the transmitter.

5. A communication system comprising:
a plurality of communication apparatuses; and an information processing apparatus that receives data from the plurality of communication apparatuses through a wireless network, wherein each of the plurality of communication apparatuses includes
- a receiver that receives data from the communication apparatus which is a predetermined transmitting source through wireless communication, and
- a transmitter that transmits (i) own apparatus information indicating a status of the own apparatus and (ii) a transmitting source list indicating a transmitting source of the data that the receiver receives within a specific period, to the communication apparatus which is a predetermined transmitting destination or the information processing apparatus through the wireless communication with setting the information processing apparatus to a receiving destination, and the information processing apparatus includes
- an information receiver that receives the own apparatus information of each of the plurality of communication apparatuses and the transmitting source list of each of the plurality of communication apparatuses from the communication apparatus which is the predetermined transmitting source through the wireless communication, and
- a detector that detects abnormality of the wireless network based on the received own apparatus information of the plurality of communication apparatuses and the received transmitting source list of the plurality of communication apparatuses.

6. A communication apparatus comprising:
an extracting unit, wherein when a network that transmits data from a plurality of communication apparatuses with setting a specific communication apparatus to a receiving destination is established, the extracting unit extracts one communication apparatus from among a plurality of communication apparatuses not included in a specific group including the specific communication apparatus based on a distance between each of a plurality of communication apparatuses included in the specific group and each of the plurality of communication apparatuses not included in the group; and a selector that selects, from among the plurality of communication apparatuses included in the group, a communication apparatus whose distance from the communication apparatus extracted by the extracting unit meets a predetermined condition as a transmitting destination to which the extracted communication apparatus transmits the data through wireless communication on the network.

7. The communication apparatus according to claim 6, wherein
the extracting unit acquires, for each communication apparatus not included in the group, a value of an N-th (N is an integer of 2 or more) shortest distance among the distances between the communication apparatus not included in the group and the plurality of communication apparatuses included in the group, and
the extracting unit extracts the one communication apparatus based on the value of the N-th shortest distance acquired for each communication apparatus not included in the group.

8. The communication apparatus according to claim 7, wherein the extracting unit extracts a communication apparatus whose acquired value of the N-th shortest distance is smallest among the plurality of communication apparatuses not included in the group as the one communication apparatus.

9. The communication apparatus according to claim 6, wherein the selector selects a predetermined number of communication apparatuses in ascending order from a communication apparatus whose distance from the communication apparatus extracted by the extracting unit is the shortest, from among the plurality of communication apparatuses included in the group as the transmitting destination of the extracted communication apparatus.

10. The communication apparatus according to claim 9, wherein after selecting the predetermined number of communication apparatuses, the selector includes the communication apparatus extracted by the extracting unit in the group.

* * * * *